United States Patent [19]

Wang

[11] Patent Number: 5,344,325
[45] Date of Patent: Sep. 6, 1994

[54] AUTOMATIC TRACKING ASTRONOMICAL GLOBE

[76] Inventor: Zn-Hu Wang, Suite 1, 11F, 95-8 Chang Ping Road, Sec. 1, Taichung, Taiwan

[21] Appl. No.: 61,689

[22] Filed: May 17, 1993

[51] Int. Cl.$^5$ .............................................. G09B 27/06
[52] U.S. Cl. ...................................... 434/288; 368/16
[58] Field of Search .................... 434/288, 287, 285; 368/15, 16, 17, 18

[56] References Cited

U.S. PATENT DOCUMENTS

| | | | |
|---|---|---|---|
| 2,399,365 | 4/1946 | Link | 434/288 |
| 2,892,268 | 6/1959 | Hagner | 434/285 |
| 2,985,969 | 5/1961 | Farquhar | 434/288 |
| 4,136,397 | 1/1979 | Pierce | 368/15 X |

*Primary Examiner*—Gene Mancene
*Assistant Examiner*—Jeffrey A. Smith

[57] ABSTRACT

An automatic tracking astronomical globe comprising an annular frame disposed on the upper portion of a mount in a vertical position, an azimuth circle secured across a diameter of the annular frame in a horizontal position, and a transparent celestial globe with a concentric, internal terrestial globe, disposed concentrically within the annular frame and azimuth circle by a polar axle. A synchronous motor disposed in the mount and operating through a globe rotation drive mechanism, rotates the celestial globe at the rate of one revolution per sidereal day. A pair of solar and lunar drive mechanism are disposed in two drive boxes secured to the inner wall of the celestial globe at diametrically opposed positions, and engaged with a stationary equatorial gear formed along the equator of the terrestial globe. The solar and lunar drive mechanisms affect the rotation of a solar and lunar marker around the circle of the ecliptic of the celestial globe, at the rate of one revolution per sidereal year and sidereal month, respectively. An integral Gregorian calender and Chinese lunar calender are also provided as well as a horizon sphere enabling the determination of the horizon coordinates of a celestial object represented on the celestial globe.

12 Claims, 25 Drawing Sheets

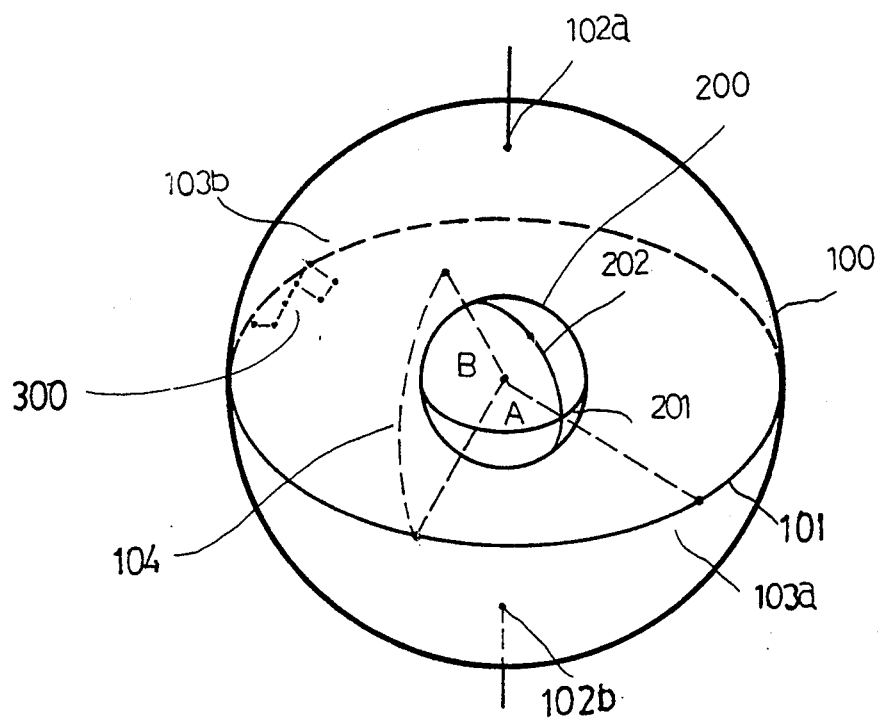
F I G. 1
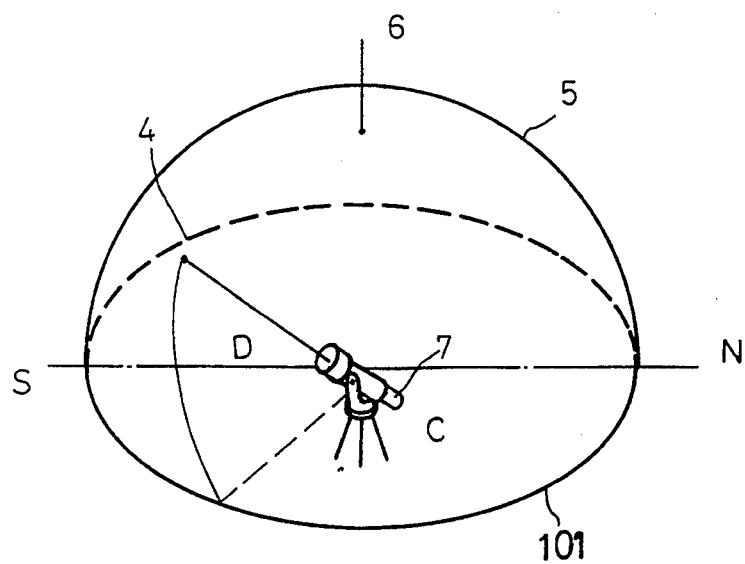
F I G. 2

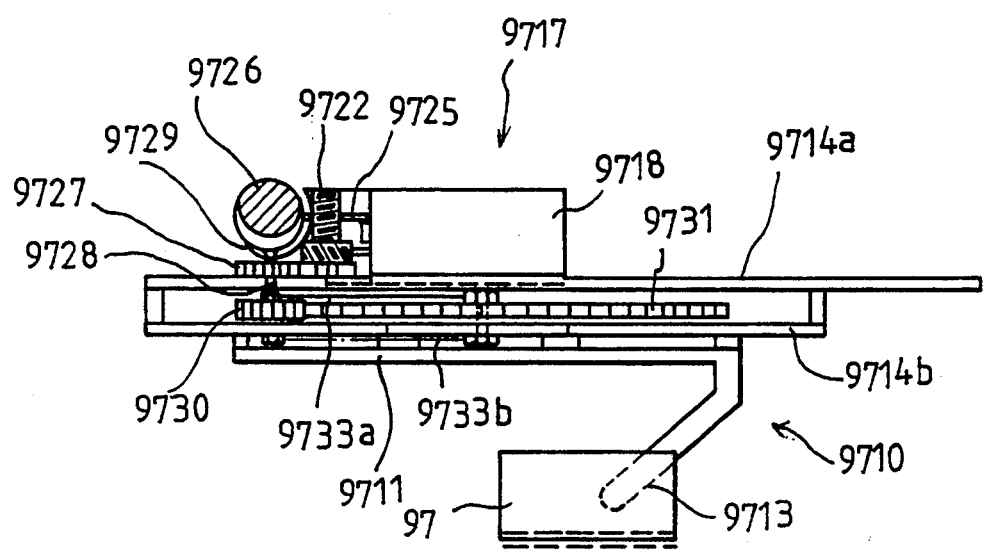
F I G. 28

AUTOMATIC TRACKING ASTRONOMICAL GLOBE

BACKGROUND OF THE PRESENT INVENTION

The present invention relates to an astronomical globe and more particularly to an automatic tracking astronomical globe that can be used to find the positions of the sun, moon, and prominent stars at any time from a fixed position on the earth.

The automatic tracking astronomical globe of the present invention is based on the concept of the celestial sphere known since antiquity.

Referring to FIG. 1 of the drawings the celestial sphere 100 is an imaginary sphere of infinite radius with the earth 200 at its center. Stars grouped into the well known constellations 300 of the zodiac were assummed to be affixed to celestial sphere 100 which rotates in a clockwise or easterly direction relative to earth 200, completing one revolution in a sidereal day.

A sidereal day having a period of 23 hours, 56 minutes, and 3 seconds, or about 4 minutes shorter than our 24 hour civil day which is based on the position of the sun.

As the true distance of stars away from the planet earth are now known to be measured in light-years, this model is sufficiently accurate for many viewing purposes.

The only apparent motion of the fixed stars was in circular paths called diurnal circles, due to the daily rotation of the celestial sphere which we now know of course to be due to the earth's rotation.

An equatorial coordinate system is used to determine the position of a star on the celestial sphere of similarity with the system of longitudes and latitudes used to determine positions on the surface of the earth.

The celestial latitude or declination A of a star is measured from the celestial equator 101 of celestial sphere 100 which is defined by the projection of the earth's equator 201 thereon. The declination is measured in degrees from 0 degrees on celestial equator 101 to + or −90 degrees to the respective north and south celestial poles, 102a and 102b.

Our longitude co-ordinates on earth are defined in terms of degrees east or west of the prime meridian circle 202 passing through Greenwich Observatory in England. However, on the celestial sphere a different reference based on the vernal equinox 103a is used.

Vernal equinox 103a and autumnal equinox 103b, diametrically opposite from it on celestial sphere 100, are defined by the intersection of celestial equator 101 and the circle of the ecliptic 104.

Ecliptic 104 represents the apparent path of the sun around the celestial sphere. As the earth revolves around the sun, the sun appears to shift slowly eastwards from its position in the sky, returning to the same position after a sidereal year, having a period of about 365.265 civil days, which is slightly more than 6 hours longer than a 365 day civil year.

Ecliptic 104 assumes an angle of about 23.5 degrees with respect to celestial equator 101 due to the tilt of the earth's axis relative to the rotational plane of its orbit about the sun.

The autumnal and vernal equinoxes, 103a and 103b, correspond to the times in fall and spring, respectively, when the sun is at celestial equator 101 and we have days and nights of equal duration.

The tropical year, which accurately tracks the changes in the seasons and is the basis of the Gregorian calender used worldwide, has a length of about 365.242 civil days, or slightly less than 6 hours longer than a 365 day civil year.

The Gregorian calender with its system of an intercalated day, i.e. a Febuary 29th, on leap years with a 4 year cycle with the exception of century years divisible by 400, closely approximates the 365.242 day tropical year on average, so that the seasons do not become out of step with the dates on the calender.

The sidereal year is some 20 minutes longer than the tropical year as the sidereal year takes into account the slow precession of the earth's axis, which is similar to the gyration of a spinning top.

The celestial longitude or right ascension B of a celestial object is measured in terms of hours, minutes, and seconds from the vernal equinox instead of degrees, with one hour being the equivalent of 15 degrees, 24 hours equaling a full 360 degree sweep back to the origin.

The dog star Sirius at point 4, for example, is the brightest star in the sky and has a declination of −16 degrees and 39 minutes and a right ascension of 6 hours, 42 minutes, and 54 seconds.

Astronomers keep time with a sidereal clock and a star of the same declination as the latitude of an observation point on the earth is directly overhead when its right ascension matches the local sidereal time.

The moon can also be represented on the celestial sphere, but like the sun moves slowly eastward across the celestial sphere, due to its orbit about the earth. The plane of its orbit assumes an angle of about 5.2 degrees with respect to the ecliptic, with the moon completing one orbit in about 27.322 civil days to define a sidereal month.

While the sidereal month accurately represents the cycle of change of the position of the moon on the celestial sphere, the synodic month accurately represents the cycle of the lunar phases, having a period of about 29.531 civil days. In that period of time the moon proceeds from the phase of a new moon to a full moon and back again to a new moon.

The synodic month is longer than the sidereal month due to the change in the earth's position relative to the sun as the moon moves along its orbit, the lunar phase being a function of the relative angles between the earth, sun, and moon.

The Chinese lunar calender, which is actually based on both solar and lunar cycles, is used concurrently with the Gregorian calender in many parts of Asis, and has months based on the synodic cycle.

The new moon and full moon always fall on the first and fifteenth day of a chinese lunar month, respectively. As the synodic period is an irrational fraction of a day in excess of 29 days in length, the Chinese lunar calender comprises a non-periodic sequence of long months with 30 days and short months with 29 days, with the sequence of long and short months in a 12 month year varying from year to year.

The Chinese lunar calender also uses a sequence of 24 fortnightly periods, which include the beginnings of the seasons, equinoxes, and solstices of the western calender, that divides the tropical year into 24 periods with each period representing a 15 degree motion of the sun along the path of the ecliptic.

The periods are actually longer than a fortnight and average 15.218 days in length, the varying length of the periods being due to the elliptic orbit of the earth about the sun, with the sun moving through different 15 degree sectors on the ecliptic at different speeds.

The 24 fortnightly periods would of course fall on different dates on the Chinese lunar calender from one year to the next. On average, after every 33 months an extra month must be intercalated into the normal 12 months to contain all 24 fortnightly periods in the same year, thus keeping the chinese lunar calender in step with the seasons.

Though the equatorial co-ordinates discussed above are useful for reference and calculation, astronomers in the field or amateur stargazers use a different set of co-ordinates to point their telescopes or viewing instruments.

Referring to FIG. 2, an observer on any point of the earth, could with the aid of a compass and a level or plumb bob, determine his or her meridian circle 5 and zenith 6. Zenith 6 is the point directly overhead on celestial sphere 100 from a given location on earth. A line containing that location and its zenith passes through the earth's center.

The observer's meridian circle 5 is a circle containing the north and south celestial poles and lies on the same plane as the observer's location.

Telescope 7 is pointed towards a celestial object with the guidance of a set of horizon co-ordinates. The telescope is rotated in a horizontal plane from 0 to 360 degrees from the southern direction, according to an azimuth angle C, and in a vertical plane from 0 degrees, pointing towards celestial horizon 105, to 90 degrees, pointing towards zenith 6, according to an elevation angle D.

Whereas, the equatorial co-ordinates given in star charts and tables are fixed points on the celestial sphere, the azimuth angle C and elevation angle D of a celestial object varies with the longitude and latitude of the observation point and also with time.

Though it is possible to calculate the local azimuth and elevation of a celestial object given its equatorial co-ordinates and the latitude and longitude of the location, a sidereal clock would also have to be at hand or calculation of the sidereal time from the local civil time would have to be done. This process tends to be tedius even with an electronic calculator, and takes away from the spirit of stargazing.

The automatic astronomical globe of the present invention however offers to a user a self contained model of the celestial sphere that once initially calibrated for his or her location will automatically and graphically reveal the positions of the fixed stars, sun, and moon and allow the quick determination of their local azimuth and elevation in step with the change of sidereal time.

Though clock-driven celestial globes have been provided in the past, some even with representation of the motion of the sun and moon, none offer the ease of initial calibration and possibility of adjustment as provided by the automatic tracking astronomical globe of the present invention.

Moreover, the automatic tracking astronomical globe of the present invention provides a means of quickly determining the horizon co-ordinates of any object on the celestial globe thereof, and an integral Gregorian and Chinese lunar calenders, the latter of which also indicates the lunar phases.

SUMMARY OF THE PRESENT INVENTION

The automatic tracking astronomical globe of the present invention has a first objective to provide a model of the celestial globe that rotates in step with the sidereal rotation of the earth, a second objective of providing a model of the motion of the sun and moon along the celestial sphere, a third objective of providing an integral Gregorian and Chinese lunar calender which indicate the dates thereon with the passage of time, and a fourth objective of providing a means to quickly determine the horizon co-ordinates of a prominent star, the sun, or the moon, relative to a user's location at the time of measurement.

The automatic tracking astronomical globe of the present invention comprises a mount with a lower base on which is secured a compass, an annular frame secured in a vertical position to the top of the mount, an azimuth circle secured across a diameter of the annular frame in a horizontal position, and a celestial sphere with an enclosed, concentric terrestial sphere secured within the annular frame and azimuth circle.

A synchronous motor, motor controller circuit, and speed reducer are situated within the lower portions of the mount. The synchronous motor is precisely controlled by its controller circuit which is based on a quartz crystal oscillator. The motor shaft of the synchronous motor is coupled to the speed reducer.

The celestial globe and terrestial globe are supported within the annular frame and azimuth circle in a concentric position, by a polar axle which passes through the north and south celestial poles of the celestial globe and the north and south poles of the terrestial globe.

The polar axle is rotatably secured to the inner periphery of a polar axle yoke, which in turn is rotatably secured to the annular frame in a concentric position.

The polar axle is secured to the north celestial pole of the celestial sphere through a freewheel. The freewheel allows the celestial sphere to rotate in a clockwise direction under the action of the synchronous motor with the celestial sphere making one revolution in a sidereal day. The celestial sphere may be rotated manually in a counter-clockwise direction whereby the freewheel disengages the motion of the celestial sphere from the polar axle.

A concentric sleeve is disposed over a major portion of the length of the polar axle, extending on one end from the north pole of the terrestial globe to which it is secured, passing through the south pole thereof, to the rotating plate of a friction bearing to which its opposite end is secured. The friction bearing is disposed near one end of the polar axle which passes through it, with the fixed plate of the friction bearing being secured to the polar axle yoke.

A rotation knob formed on the rotating plate of the friction bearing protrudes from the open inner periphery of the annular frame, and enables manual rotation of the terrestial globe.

The celestial globe is rotated through a globe rotation drive mechanism comprising a polar axle gear secured to one end of the polar axle opposite from the friction bearing, a ring gear rotatably secured to the polar axle yoke in a concentric position, a drive gear rotatably secured to the lower portion of the annular frame, and a sliding coupler disposed within the upper portion of the mount.

The sliding coupler is slidingly engaged with the splined upper portion of the output shaft of the speed reducer. When the sliding coupler is raised by a decoupling and raising mechanism, a sliding jaw of a clutch, formed on the upper portion thereof engages the stationary jaw of a clutch formed on the lower portion of the drive gear shaft.

The drive gear is engaged with the ring gear, which in turn engages the polar axle gear, enabling the rotation of the celestial globe at the rate of one revolution per sidereal day.

The first objective of the present invention is thereby achieved.

The celestial globe is actually divided into two hemispheres along the circle of the ecliptic, with a pair of juxtaposed internally toothed ring gears rotatably secured between the respective rims thereof. The lower ring gear is designated the first ecliptic gear and the upper ring gear as the second ecliptic gear.

A pair of solar and lunar drive mechanisms stored in two round drive boxes are secured to the two hemispheres of the celestial sphere at diametrically opposed positions. An epicyclic gear in each drive box engages an equatorial gear formed along the equator of the stationary terrestial globe.

As the celestial sphere rotates about the terrestial globe, the epicyclic gears in each respective drive box are rotated by the equatorial gear of the terrestial globe. A solar drive gear and a lunar drive gear are engaged with the epicyclic gear through a respective first and second set of coupling gears.

The solar and lunar drive gears are also coupled to the first and second ecliptic gears, respectively, with the first ecliptic gear rotating in a counter-clockwise direction at the rate of one revolution per 366.261 sidereal days and the second ecliptic gear rotating in a counter-clockwise direction at the rate of one revolution per 27.398 sidereal days.

A lunar calender band is rotatably secured to the outer rim of the first ecliptic gear, the latter having an inner groove in which a solar marker is slidingly secured. The salient portion of the solar marker is disposed over the outer face of a solar calender band, disposed below the lunar calender band and rotatably secured to an outer rim of the lower hemisphere of the celestial globe.

The lunar calender band rotates in unison with the first ecliptic gear but can be manually positioned thereon. Likewise, the solar calender band can be manually positioned about the outer rim of the celestial globe.

A lunar marker is slidingly secured to a groove formed in the outer periphery of the second ecliptic gear, with the salient portion thereof disposed over the outer face of the lunar calender band.

The solar and lunar markers are carried along by the rotation of respective first and second ecliptic gears about the circle of the ecliptic of the celestial globe, with the solar marker completing one revolution in a sidereal year and the lunar marker completing one revolution in a sidereal month.

Though, as mentioned above, the moon does not actually follow the path of the ecliptic, this simplification provides reasonably accurate results that satisfies most viewing purposes.

Thus, the second objective of the present invention is achieved.

Markings formed around the outer face of the solar calender band define the months and respective dates of the Gregorian calender. As the solar marker revolves around the solar calender band in its yearly cycle, the local date is indicated by the corresponding date on the solar calender band aligned therewith.

Likewise, markings formed around the outer face of the lunar calender band define the dates of a lunar month along with correspondingly positioned astronomical symbols representing the lunar phases.

Though the lunar marker completes one revolution around the ecliptic of the celestial globe in the period of a sidereal month, its rate of rotation relative to the lunar calender band is less due to the rotation of the latter at the sidereal yearly rate. The period of revolution of the lunar marker relative to a fixed point on the lunar calender band is a close approximation of the synodic period.

As such, the lunar marker correctly indicates the corresponding dates of a lunar month and the corresponding lunar phases as it revolves around the lunar calender band.

The third objective of the present invention is thus also achieved.

A horizon sphere is provided for determining the horizon co-ordinates of a celestial object represented on the celestial globe. The horizon sphere comprises an upper and lower hemispheres. The lower hemisphere has a circular opening formed on its lower portion, and is positioned over a flange disposed on the upper portion of the mount. The upper hemisphere is positioned over the lower hemisphere, enveloping the annular frame and azimuth circle.

An elevation track is formed along a diametrical arc of the horizon sphere, extending from the rim of the circular hole of the lower hemisphere to the top portion of the upper hemisphere, and is perpendicular with the azimuth circle within.

An indexer is slidingly secured to the elevation track which has markings formed on either side defining an elevation scale.

To find the azimuth angle of a celestial object, the horizon sphere is rotated so as to align the track over its representation on the celestial globe. The marking, on an azimuth scale formed around the azimuth circle, aligned with the track indicates the local azimuth angle of the celestial object at the time of observation.

The elevation angle of the celestial object is determined by sliding the indexer along the track to position the indexer over its representation on the celestial globe. The marking on the elevation scale aligned with the indexer indicates the local elevation angle at the time of observation.

The local horizon co-ordinates of the sun and moon can also be determined with a similar procedure by aligning the indexer over the solar or lunar markers.

The fourth objective of the present invention is thereby achieved.

Before the automatic astronomical globe can be properly used, however, it must be initially calibrated for a user's location and local time.

The polar axle is first rotated within the annular frame until it is aligned with the latitude mark, on a latitude scale formed around the front face of the annular ring, corresponding to the latitude of the user's location. This is essence, aligns the polar axis of the celestial globe with the axis of the celestial sphere so that they are parallel.

The celestial globe is then positioned to a proper initial orientation with the aid of a sidereal time scale formed around the celestial equator thereon.

Conversion tables between sidereal and civil time are provided in such publications as the The Ephemeris and The Nautical Almanac, and the local sidereal time of a user's location can be derived therefrom.

The celestial globe is rotated so as to align the mark on the sidereal time scale, corresponding to the known local sidereal time, with a time indicator positioned over the celestial equator thereof.

This aligns the celestial hemisphere, observable from the user's location at the time of setting, with the azimuth circle which corresponds to the observor's celestial horizon.

The positions of the sun and moon on the celestial sphere at the local date and time can also be derived from data provided in the publications mentioned above.

The solar and lunar markers can then be manually slid to their proper initial positions along the circle of the ecliptic of the celestial globe, with the solar and lunar calender bands serving as references.

Finally, the solar and lunar calender bands can be manually rotated to align the correct dates thereon with their respective solar and lunar markers.

For a detailed discussion of the structure and mechanism of the automatic tracking astronomical globe of the present invention along with its other features and functions, please refer to the embodiment below.

BRIEF DESCRIPTION OF THE DRAWINGS

FIG. 1 is a schematic view of the celestial sphere and the equatorial system of co-ordinates.

FIG. 2 is a schematic view of the celestial hemisphere visible to an observer and the horizon system of co-ordinates.

FIG. 28 is a sectional front view of a lunar marker with amendment function of the automatic tracking astronomical globe of the present invention.

PREFERRED EMBODIMENT OF THE PRESENT INVENTION

Figure 3:
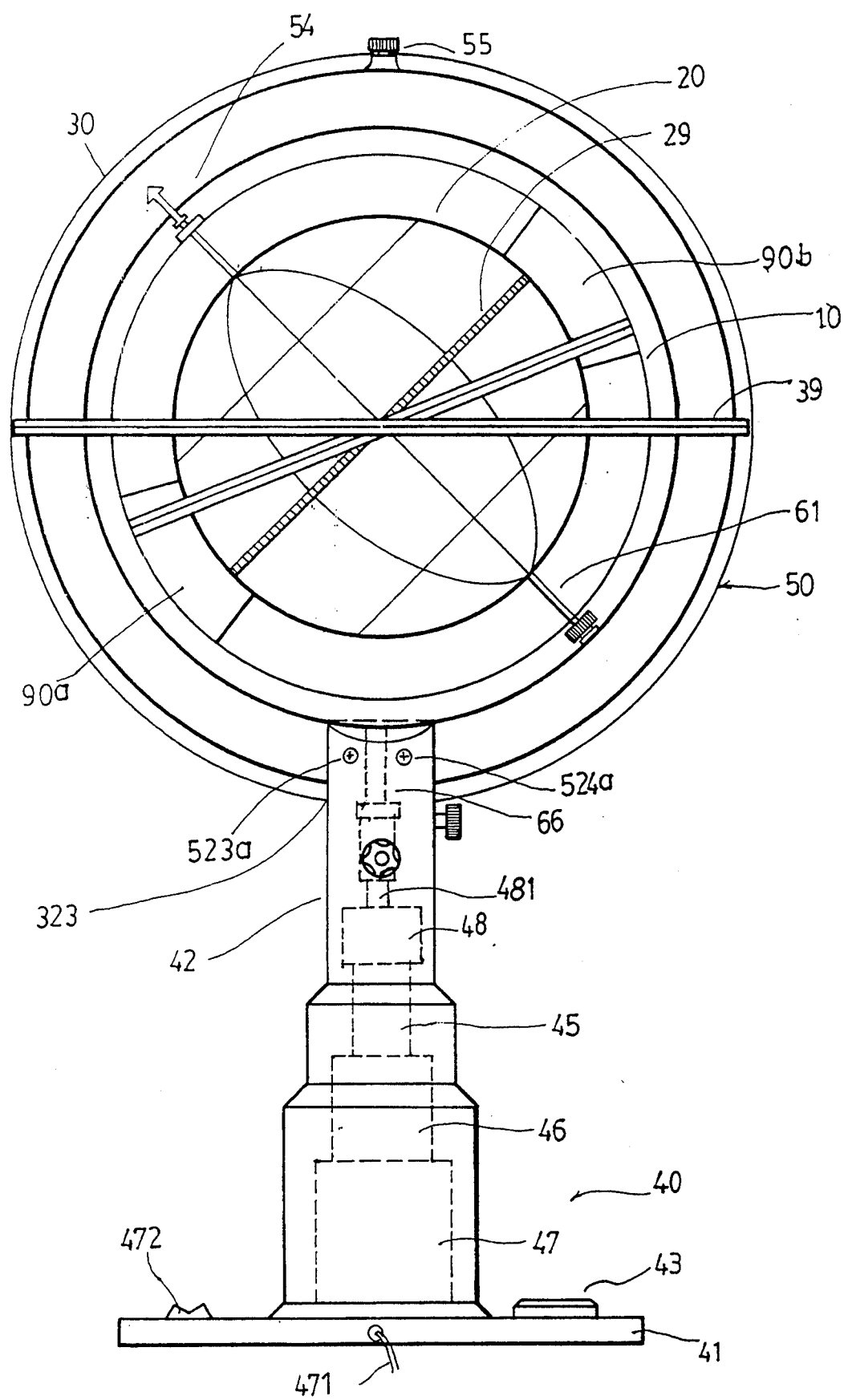
FIG. 3 is a front view of the automatic tracking astronomical globe of the present invention.

Referring to FIG. 3, the automatic tracking astronomical globe of the present invention comprises a celestial globe 10 with an enclosed concentric terrestial globe 20, an annular frame 50 disposed in a vertical position on the top portion of a mount 40 with a base 41, and an azimuth circle 39 secured across a diameter of annular frame 50 in a horizontal position.

Celestial globe 10 and terrestial globe 20 are secured within annular frame 50 and azimuth circle 39 in a concentric position by a polar axle 61.

A high precision synchronous motor 45 is disposed within mount 40 in a medial position. A motor controller 46 based on a quartz crystal oscillator is disposed below synchronous motor 45. Motor controller 46 is in turn powered by a voltage regulated power supply 47 disposed in the lower portion of mount 40. Power supply 47 receives A.C. power from external power cord 471 and is controlled by power switch 472 disposed on the side of mount 40. A precision speed reducer 48 is disposed above synchronous motor 45, being coupled to the motor shaft thereof.

Figure 4:
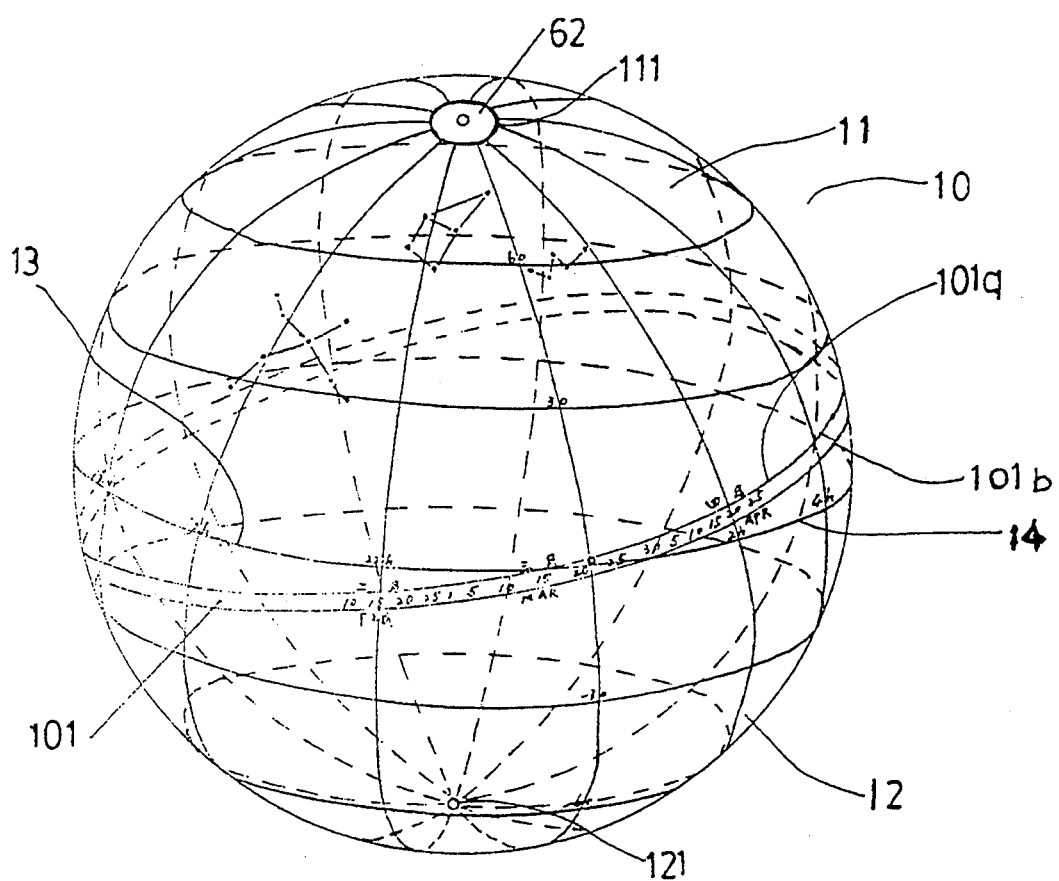
FIG. 4 is a perspective view of a celestial globe of the automatic tracking astronomical globe of the present invention.

Referring to FIG. 4, celestial globe 10 comprises a north celestial hemisphere 11 and a south celestial hemisphere 12. The circular rims 13 and 14 of respective north and south celestial hemispheres 11 and 12 are in proximity to and parallel with the circle of the ecliptic of celestial globe 10.

A coupling hole 111 is formed on the upper portion of north celestial hemisphere 11, concentric with the polar axis of celestial globe 10. An axle hole 121 is formed on the lower portion of south celestial hemisphere 12 centered over the south celestial pole of celestial globe 10.

Markings formed along the celestial equator of celestial globe 10 define a 24 hour sidereal time scale 101 with units of hours and minutes (not shown).

Points, lines, and lettering formed at pre-determined positions on the surface of celestial globe 10 denote constellations, prominent stars, and other celestial objects.

Figure 5:
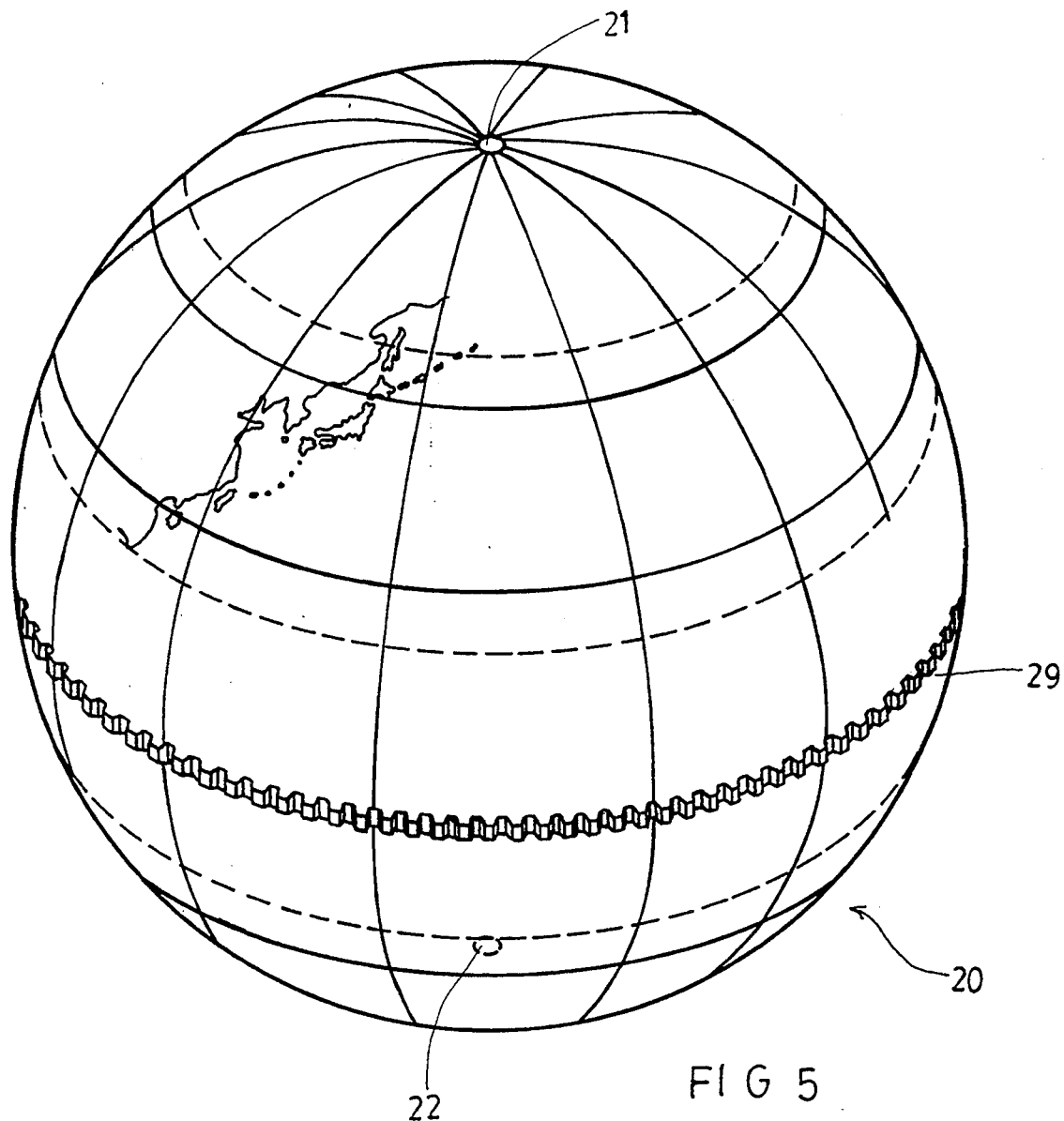
FIG. 5 is a perspective view of a terrestial globe of the automatic tracking astronomical globe of the present invention.

Referring to FIG. 5, terrestial globe 20 has axle holes 21 and 22, formed concentrically over the respective north and south poles thereof.

Lines, lettering, and other artwork are formed on the surface of terrestial globe 20 to denote nations, borders, bodies of water, meridian circles, parallels of latitude, etc. as found on a conventional earth globe.

Figure 6:
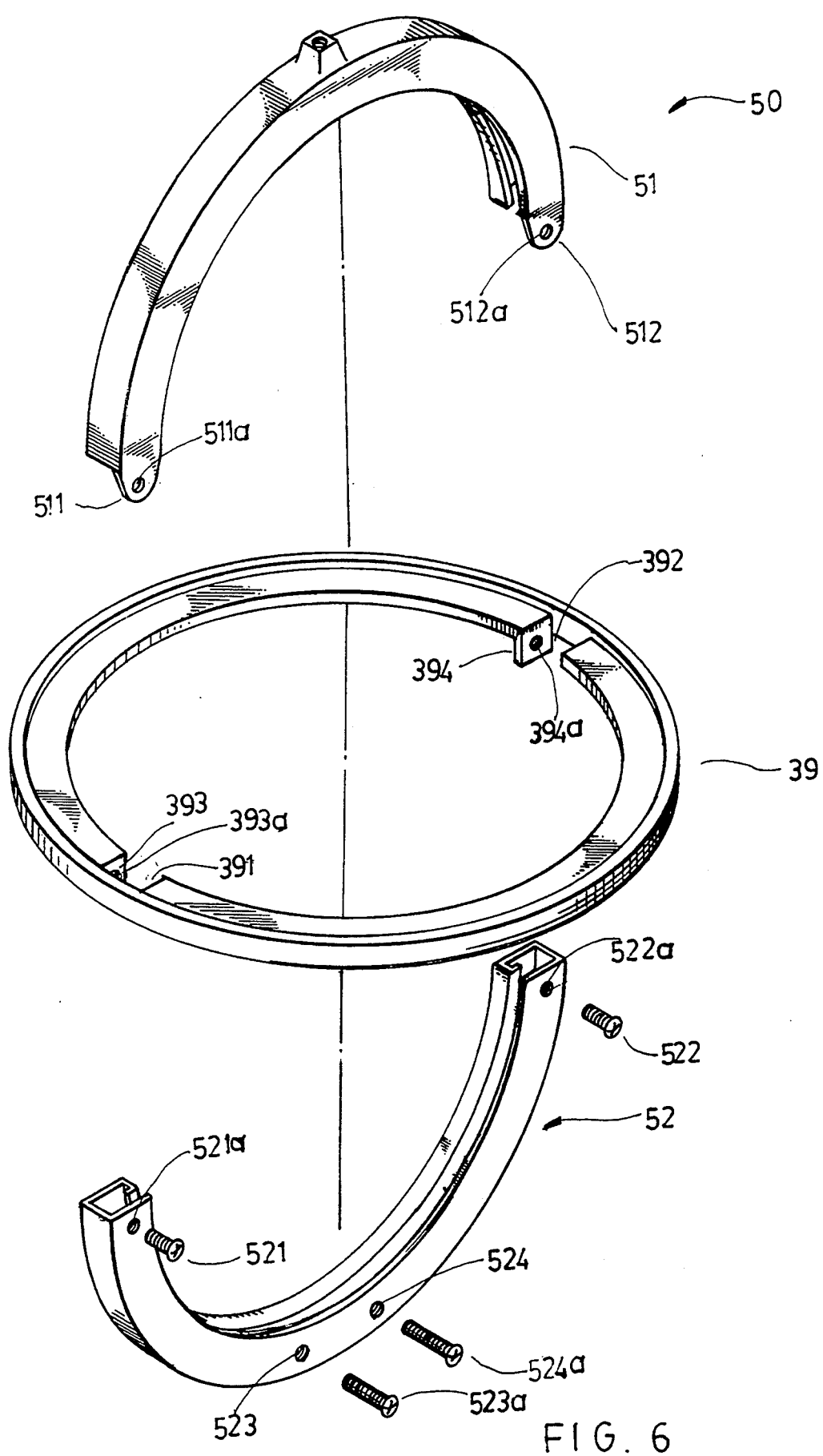
FIG. 6 is a perspective exploded view of an annular frame and azimuth circle of the automatic tracking astronomical globe of the present invention.

Referring to FIG. 6, to be interpreted as a rear view, annular frame 50 comprises two semicircular halves 51 and 52. A pair of securing lugs 511 and 512 are formed on the respective left and right ends of upper half 51 extending downward from the rear wall thereof. Securing holes 511a and 512a are formed at a pre-determined positions on respective securing lugs 511 and 512.

Azimuth circle 39 has a pair of securing slots 391 and 392 formed on the inner periphery thereof, at diametrically opposed positions. A pair of securing fins 393 and 394 extend downward from the rear edges of respective securing slots 391 and 392. Securing holes 393a and 394a are formed at pre-determined positions on respective securing fins 393 and 394.

Figure 12:
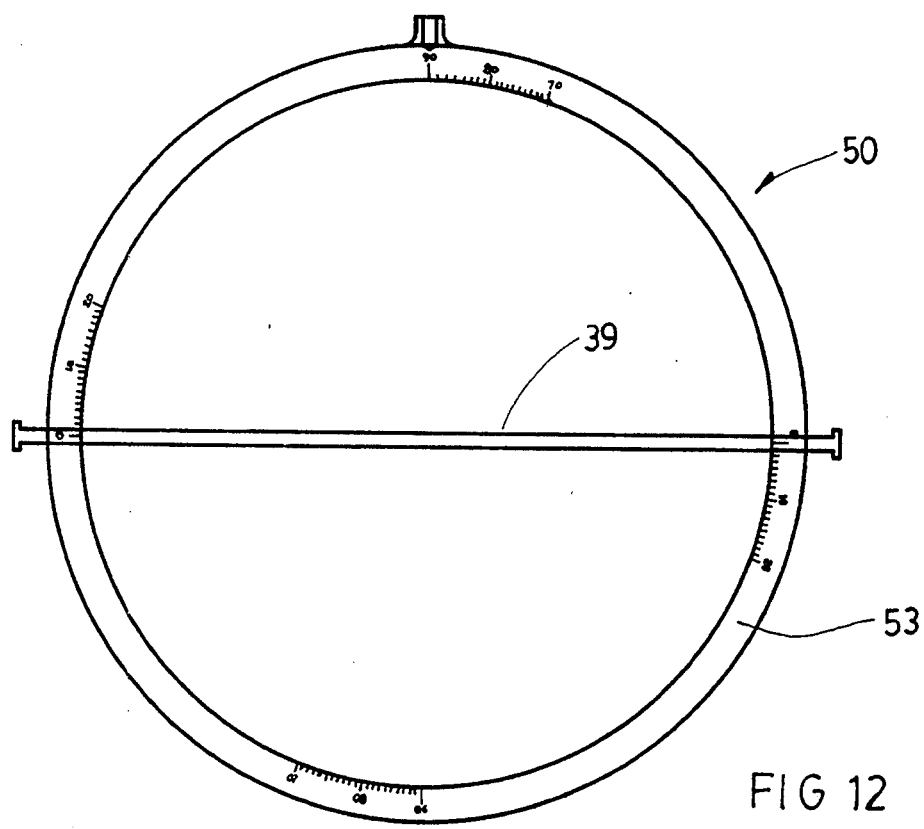
FIG. 12 is a frontal view of an assembled annular frame and attached azimuth circle of the automatic tracking astronomical globe of the present invention.
Figure 13:
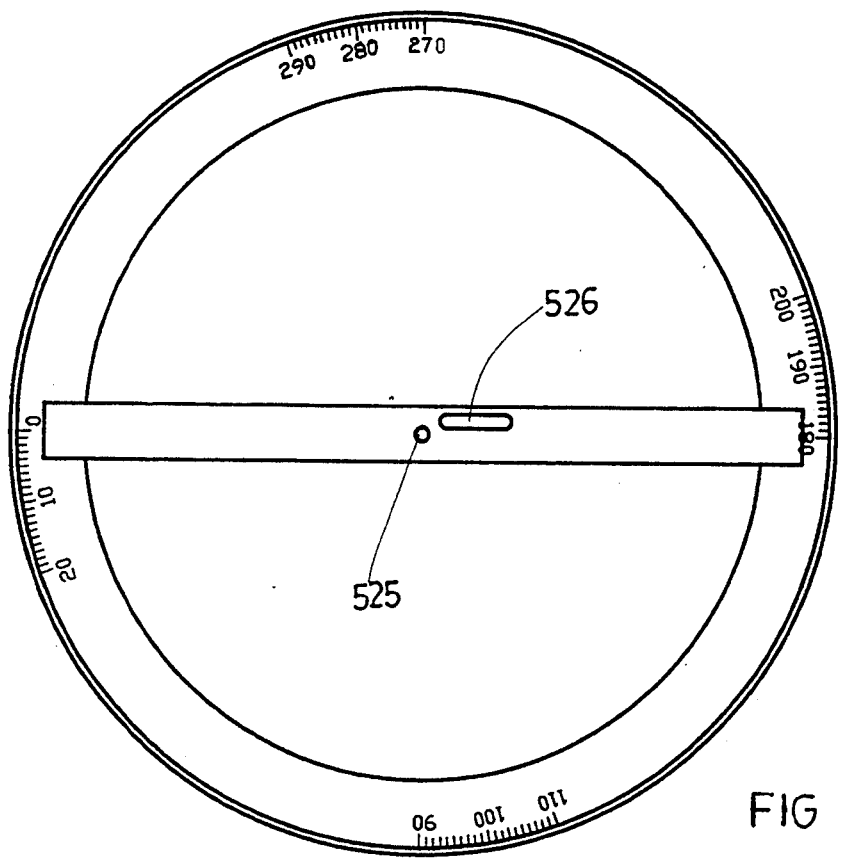
FIG. 13 is a bottom view of an assemabled annular frame and attached azimuth circle of the automatic tracking astronomical globe of the present invention.

Upper half 51 is disposed over lower half 52 with azimuth circle 39 in a medial position, and securing lugs 511 and 512 inserted into lower half 52. Securing fins 393 and 394 are sandwiched between the rear wall of lower half 52 and respective securing lugs 511 and 512. Securing holes 521a and 522a are formed on the rear wall of lower half 52 near the respective left and right ends thereof and are aligned with securing holes 393a and 394a, and securing holes 511a and 512a, respectively. A pair of threaded fasteners 521 and 522 are engaged through the respective sets of aligned securing holes to rigidly secure together upper half 51, lower half 52, and azimuth circle 39. The assembled annular frame 50 and attached azimuth circle 39 is shown in FIGS. 12 and 13.

A pair of securing holes 523 and 524 are formed on the lower portion of the rear wall of lower half 52. A pair of threaded fasteners (523a, 524a) engaged through securing holes 523 and 524 secure annular frame 50 to an opening formed on the top of mount 40.

Figure 7:
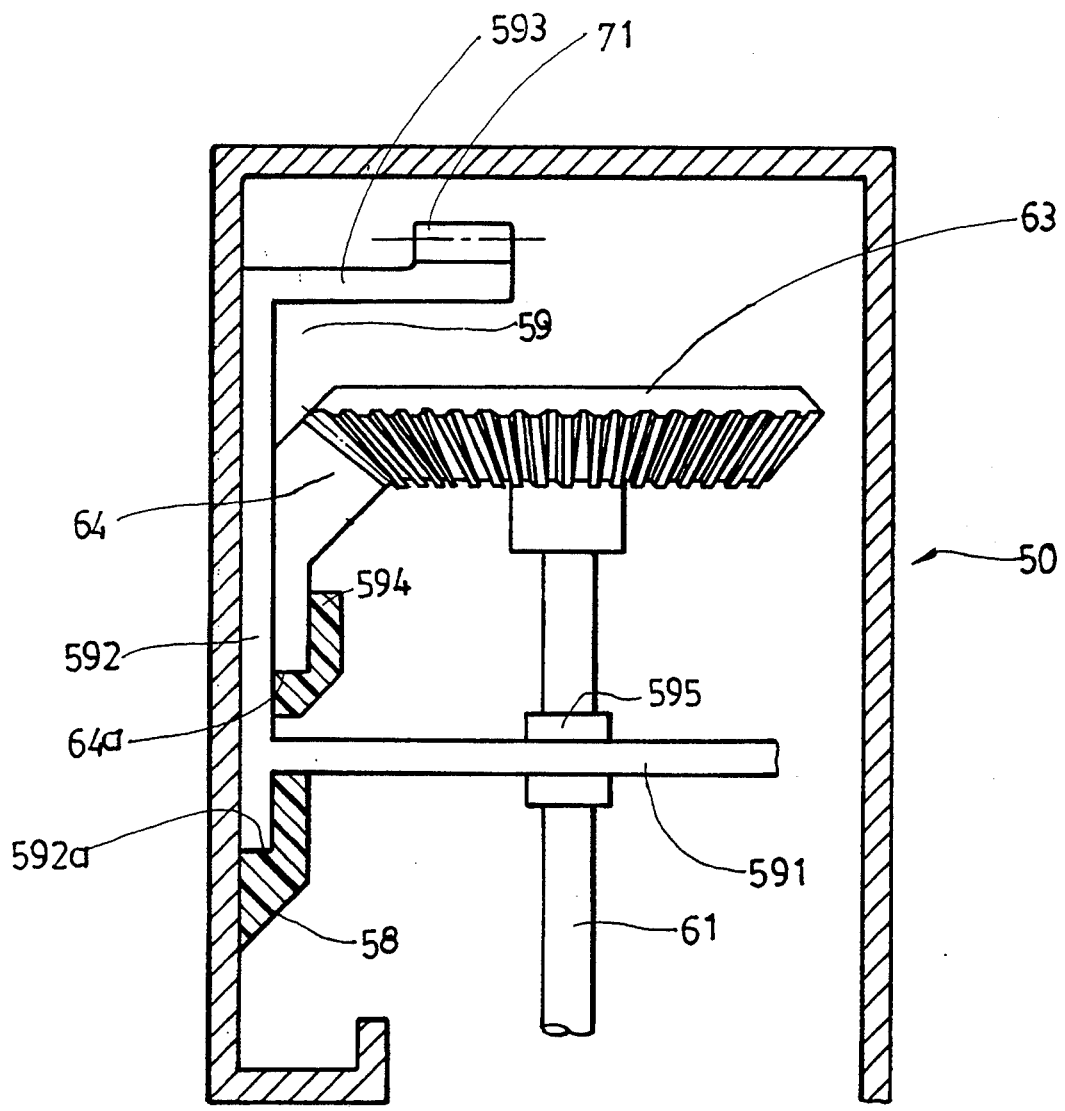
FIG. 7 is a sectional view of an annular frame and a polar axle yoke of the automatic tracking astronomical globe of of the present invention.
Figure 8:
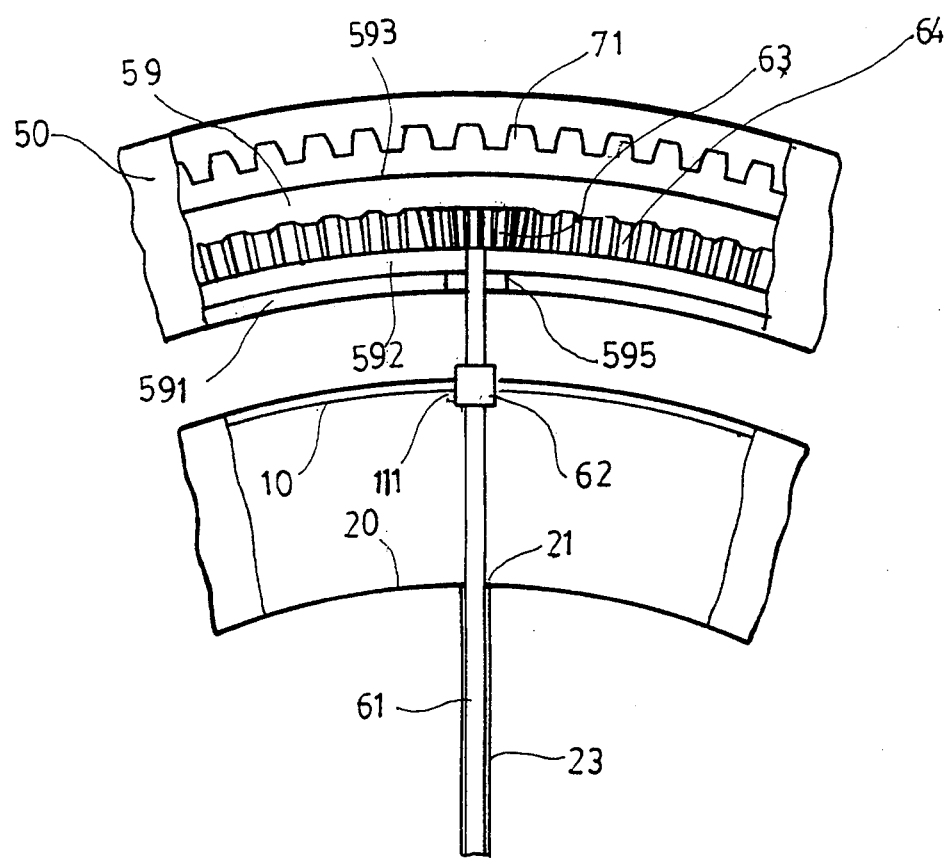
FIG. 8 is a cut-away view showing a celestial globe and terrestial globe supported within an annular frame of the automatic tracking astronomical globe of the present invention.
Figure 8:
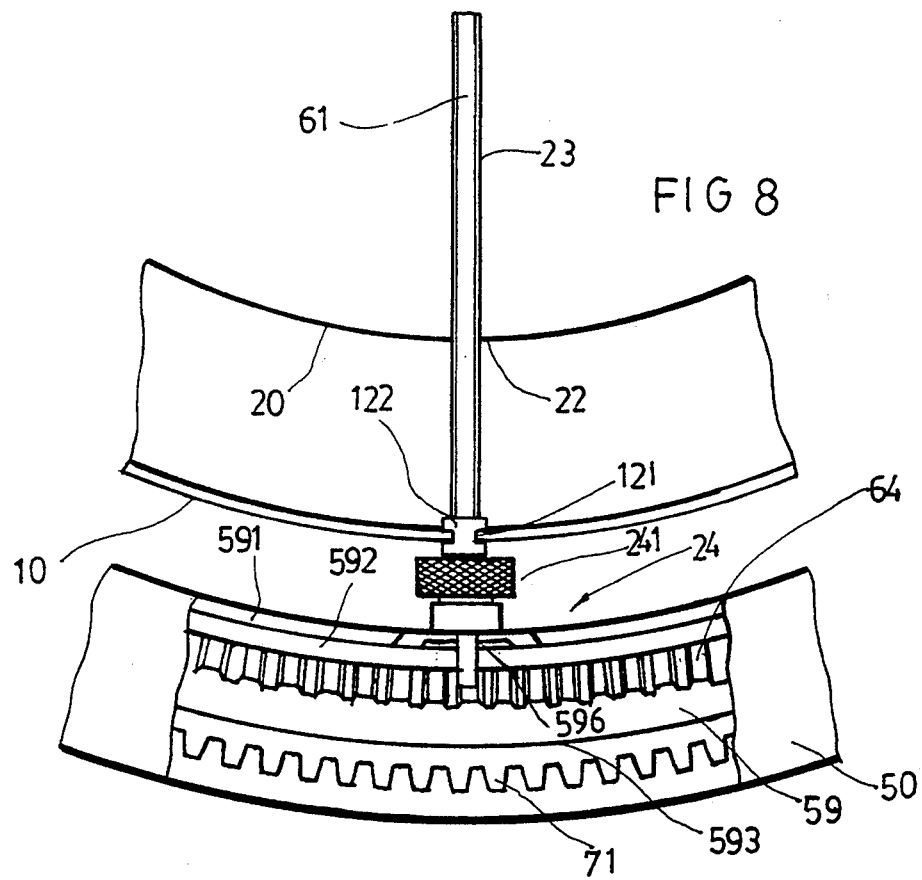

Referring to FIGS. 7 and 8, an annular shaped polar axle yoke 59 is concentrically disposed within annular frame 50. Polar axle yoke 59 comprises an inner peripheral wall 591, a side wall 592 abutting the inner surface of the front wall of annular frame 50, and an outer peripheral rim 593. A circular retainer 58 disposed over the inner peripheral edge 592a of side wall 592 rotatably secures polar axle yoke 59 in a concentric position within annular frame 50.

Celestial globe 10 and terrestial globe 20 are supported within annular frame 50 by a polar axle 61 rotatably secured to yoke 59 by a pair of bearings 595 and 596. Bearings 595 and 596 are secured respectively to the edge of inner peripheral wall 591 at diametrically opposing positions.

Figure 9:
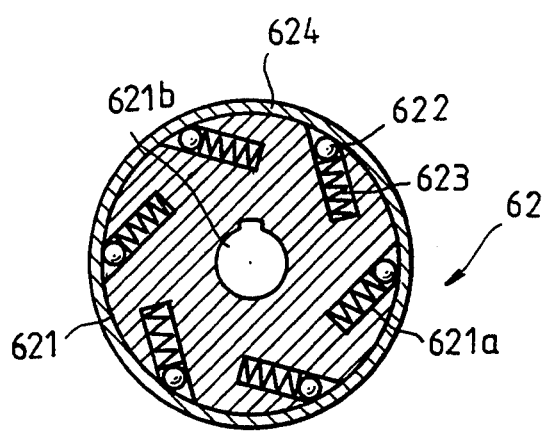
FIG. 9 is an internal top view of a overrunning type clutch of the automatic tracking astronomical globe of the present invention.

Celestial globe 10 is engaged with polar axle 61 through a precision overrunning type clutch 62, shown in detail in FIG. 9. Clutch 62 comprises an internal driver wheel 621, a plurality of rollers 622 and a matching number of springs 623 disposed in tracks 621a, and a driven felly 624. Driven felly 624 is secured to coupling hole 111 of north celestial hemisphere 11. Polar axle 61 passes through an axle hole 621b of driver wheel 621 and is secured thereto.

Clutch 62 engages polar axle 61 with celestial globe 10 in a clockwise direction of rotation relative to the north celestial pole thereof, and freewheels in a reverse direction. A user can position celestial globe 10 in a proper orientation by manually rotating celestial globe 10 in a counter-clockwise direction.

A concentric sleeve 23 is disposed over a major portion of the length of polar axle 61. One end of sleeve 23 is secured to axle hole 21 of terrestial globe 20, sleeve 23 extending through axle hole 22 thereof with the opposite end securing to a rotating block 241 of a friction bearing 24.

Figure 10:
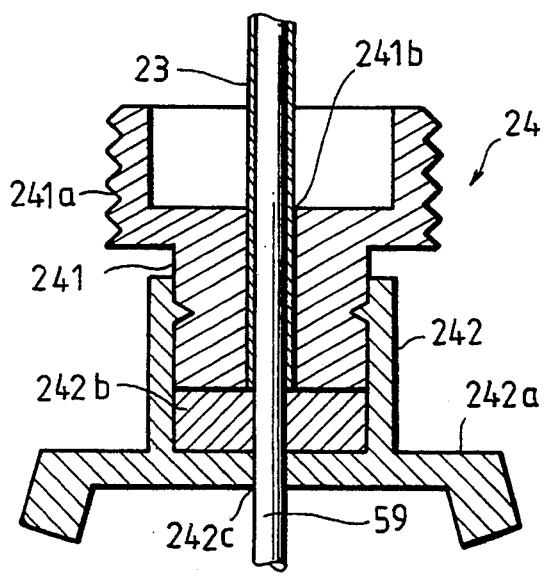
FIG. 10 is a sectional view of a friction bearing of the automatic tracking astronomical globe of the present invention.

Friction bearing 24 is disposed on the inner surface of inner peripheral wall 591 adjacent to bearing 596. As shown in detail in FIG. 10, friction bearing 24 comprises a rotating block 241 with a knurled rotation knob 241a and an axle hole 241b into which an end of sleeve 23 is inserted and secured, and a fixed block 242 with a holder 242a and friction plate 242b, both having an axle hole 242c through which polar axle 59 passes. Friction bearing 24 is secured to inner peripheral wall 591 by mechanical fasteners (not shown).

Rotation knob 241a protrudes through the open inner periphery of annular frame 50, enabling a user to position terrestial globe 20 by rotating knob 241a.

A journal 122 is secured within axle hole 121 of south celestial hemisphere 12, contacting sleeve 23.

Referring to FIGS. 3, 7, 8, and 11 to 14, celestial globe 10 is rotated by synchronous motor 45 through a globe rotation drive mechanism comprising a bevel type polar axle gear 63 secured to one end of polar axle 61 in proximity to bearing 595, a bevel type ring gear 64 rotatably secured within yoke 59 in a concentric position, a bevel type drive gear 65 with a shaft 651 rotatably secured to a bearing 651a disposed on the bottom portion of annular frame 50, and a sliding coupler 66 disposed within the upper portion of mount 40.

Polar axle gear 63 is engaged with ring gear 64, and ring gear 64 is engaged with drive gear 65.

Please refer to FIG. 7, ring gear 64 is rotatably secured within annular frame 50 by a circular journal 594 disposed over the inner peripheral rim 64a thereon.

Shaft 651 of drive gear 65 extends through a shaft hole 525 formed on the bottom portion of annular frame 50, as shown in FIG. 13, and into the upper portion of mount 40. A stationary jaw 652 of a spiral jaw type clutch is secured to the lower portion of shaft 651.

Figure 14:
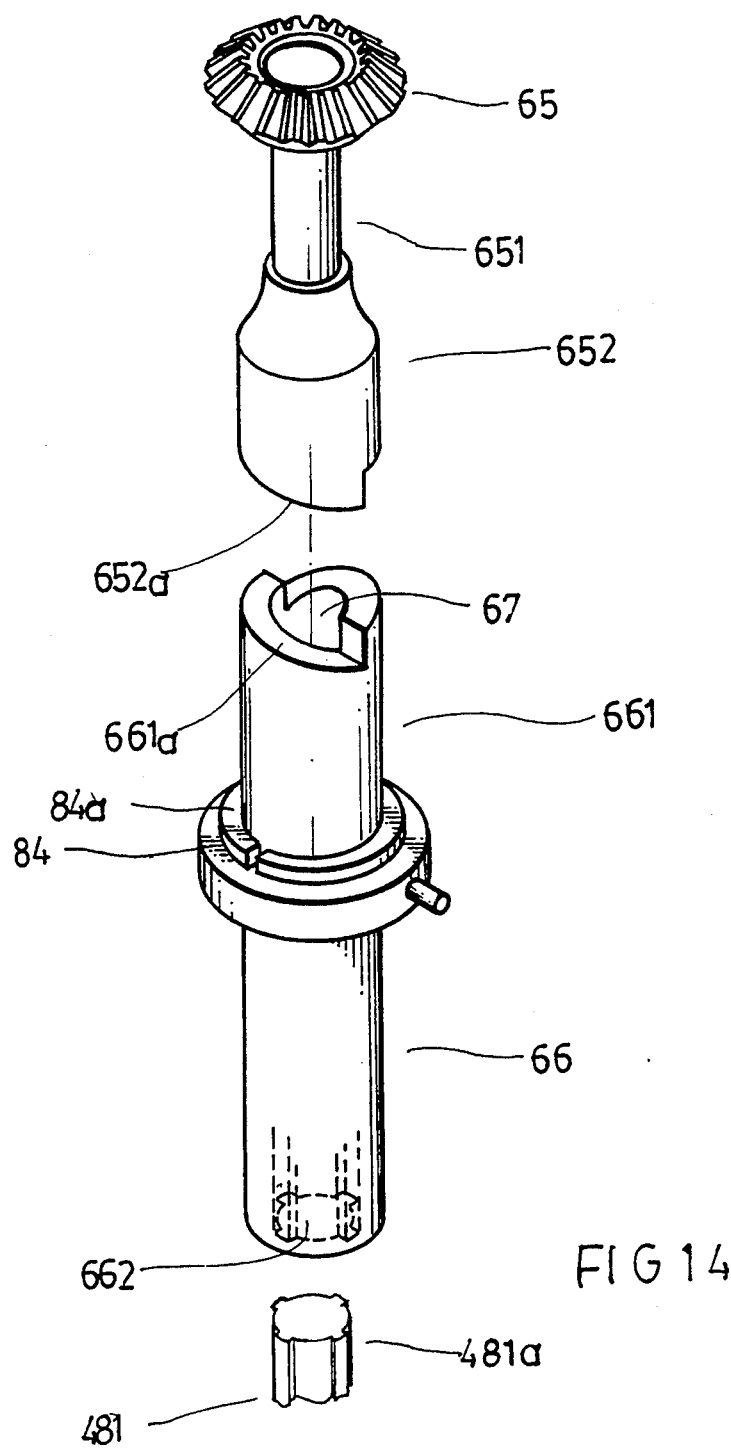
FIG. 14 is a perspective view of a sliding coupler and the coupling end of the shaft of a drive gear of the automatic tracking astronomical globe of the present invention.

Stationary jaw 652 is engaged by a sliding jaw 661 of a spiral jaw type clutch, formed on the upper portion of sliding coupler 66, when in a raised position. FIG. 14 gives a detailed view of the spiral jaw clutch, showing the spiral mating surfaces 652a and 661a on respective stationary and sliding jaws 652 and 661, and their respective hollow cylindrical centers 67.

Sliding coupler 66 has a cavity 662 formed within the lower portion thereof. A splined upper portion 481a of the output shaft 481 of speed reducer 48, having the same cross-sectional shape and dimensions as cavity 662, is slidingly engaged therein.

Sliding coupler 66 is held in position by a mounting bushing (not shown) secured to the inner wall of mount 40.

The rotational speed of synchronous motor 45, the reduction ratio of speed reducer 48, and the drive ratios between drive gear 65 and ring gear 64, and between ring gear 64 and polar axle gear 63, have all been predetermined to rotate celestial globe 10 at the constant rate of one revolution per sidereal day within a high degree of precision.

Figure 16:
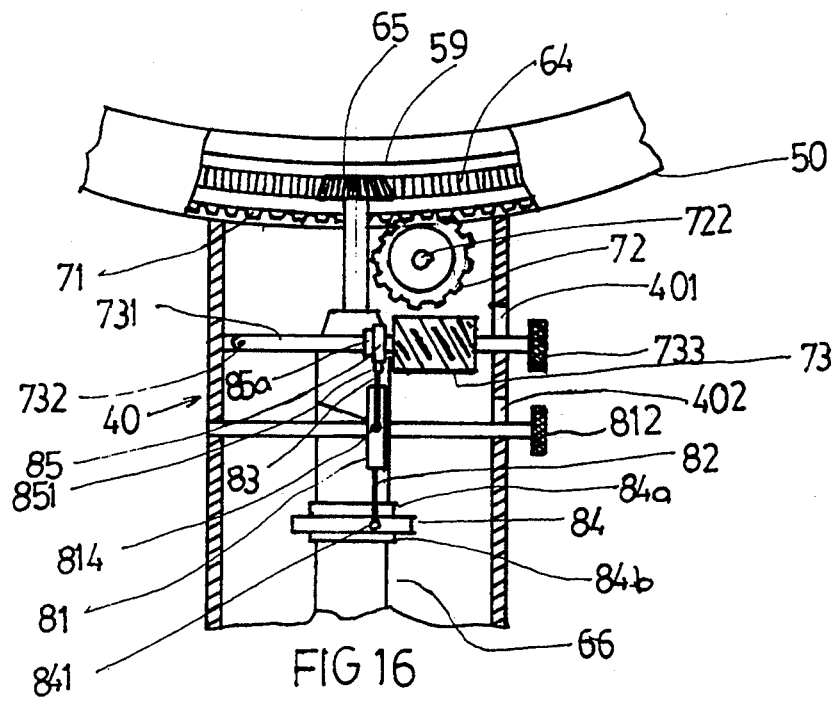
FIG. 16 is a frontal view of a decoupling and raising mechanism and other components disposed within the upper portion of a mount of the automatic tracking astronomical globe of the present invention, with the decoupling and raising mechanism engaging a globe rotation drive mechanism.
Figure 17:
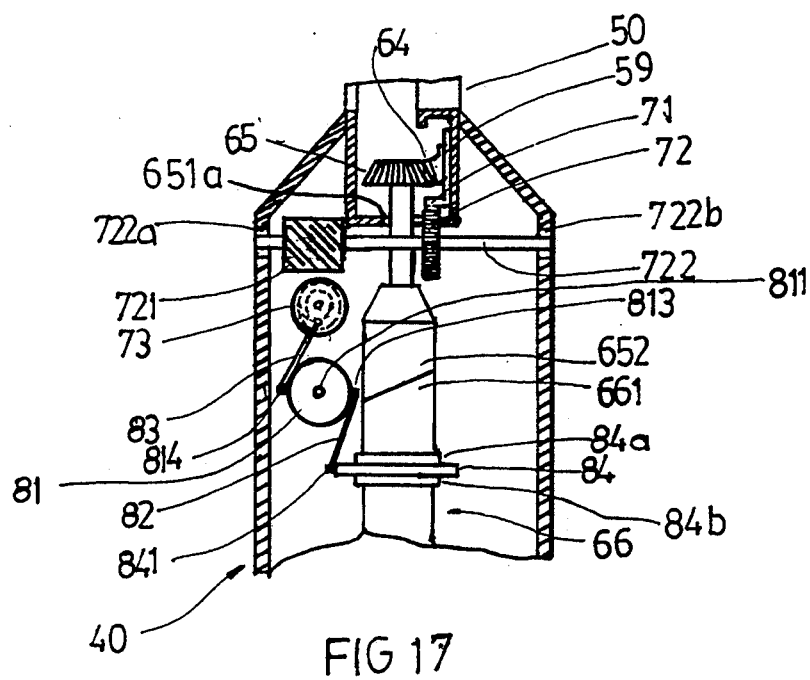
FIG. 17 is a side view of a decoupling and raising mechanism and other components disposed within the upper portion of a mount of the automatic tracking astronomical globe of the present invention with the decoupling and raising mechanism engaging a globe rotation drive mechanism.

Yoke 59 can be rotated within annular frame 50 about an axis perpendicular to the plane thereof, (as shown in FIG. 16 and 17) by a latitude adjustment mechanism comprising a spur type circumferential gear 71 formed around the edge of outer peripheral rim 593, a spur type coupler gear 72 and a worm gear 721 secured to a common shaft 722, and a worm 73.

Coupler gear 72 and worm gear 721 are disposed in the upper portion of mount 40 with coupler gear 72 engaging circumferential gear 71 through a coupler slot 526 formed on the bottom of annular frame 50, as shown in FIG. 13. Shaft 722 is rotatably secured to bearings 722a and 722b, secured to the inner wall of mount 40.

Shaft 731 and worm 73 are disposed in the upper portion of mount 40 with shaft 731 being pivotably secured to a pivot 732, secured to the inner wall thereof. Worm 73 engages worm gear 721 when shaft 731 is in a raised position. The end of shaft 731 opposite from pivot 732 extends to the exterior of mount 40 through a slot opening 401 formed on the side thereof, with a latitude adjustment knob 733 secured thereon.

Referring to FIGS. 16 to 19, a decoupling and raising mechanism simultaneously raises shaft 731 and lowers sliding coupler 66 to enable rotation of yoke 59 by manual rotation of latitude adjustment knob 733. The decoupling and raising mechanism comprises a wheel 81 with a shaft 811, a first crank rod 82 and a second crank rod 83, and a first collar 84 and a second collar 85.

One end of shaft 811 is rotatably disposed on the inner wall of mount 40, with the opposite end being rotatably disposed behind a hole 402 formed on the front of mount 40, through which shaft 811 passes through to secure to a decoupling knob 812.

A pair of pins 813 and 814 protrude from respective front and rear sides of wheel 81. The upper end of first crank rod 82 is pivotably secured to pin 813 and the lower end of crank rod 83 is pivotably secured to pin 814.

First collar 84 is loosely secured to the lower portion of sliding coupler 66 by a pair of retaining rings 84a and 84b. A pin 841 protrudes from the side of collar 84 with the lower end of first crank rod 82 pivotably secured thereon.

Second collar 85 is loosely secured to shaft 731 by a retaining ring 85a, disposed adjacently to one side of worm 73 and opposite from latitude adjustment knob 733. A pin 851 protrudes from the side of collar 85 with the lower end of second crank rod 83 is pivotably secured thereon.

By manually rotating decoupling knob 812 in a counter-clockwise direction, first crank rod 82 lowers and pivots, causing first collar 84 and attached sliding coupler 66 to slide downwards within bushing 67. Clutch jaw 661 is then disengaged from clutch jaw 652.

Likewise, second crank rod 83 raises and pivots causing second collar 85 and attached shaft 731 to pivot upwards about pivot 732. Worm 73 is then engaged with worm gear 721, and yoke 59, along with polar axle 61 secured therein, can be rotated with respect to annular frame 50 by manually turning latitude adjustment knob 733.

Figure 15:
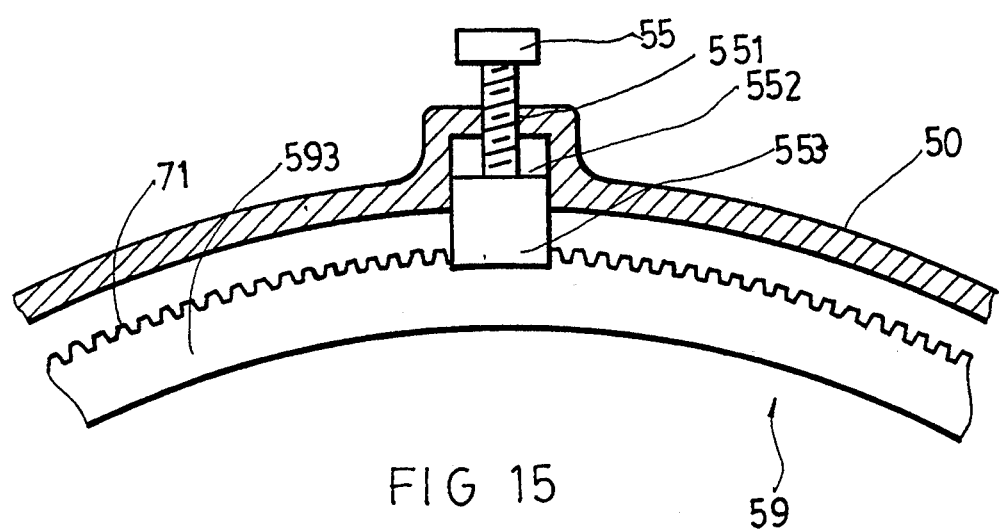
FIG. 15 is an internal view of the uppermost portion of an annular frame showing a locking screw securing the position of a polar axle yoke of the automatic tracking astronomical globe of the present invention.

Referring to FIG. 15, locking screw 55 is engaged through a threaded hole 551, disposed over an internal cavity 552 formed within the outer wall of annular frame 50. A brake shoe 553 is disposed within cavity 552, abutting outer peripheral rim 593 of yoke 59. When locking screw 55 is rotated in a clockwise direction the end thereof forces brake shoe 553 tightly against outer peripheral rim 593, preventing further rotation of yoke 59.

Figure 23:
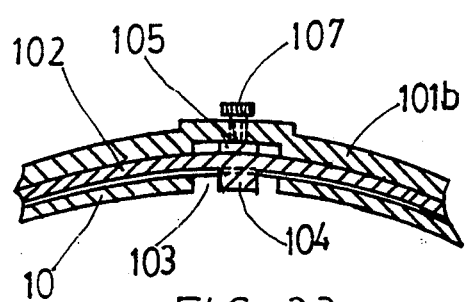
FIG. 23 is a sectional end view of a time scale on the celestrial globe of the automatic tracking astronomical globe of the present invention.
Figure 22:
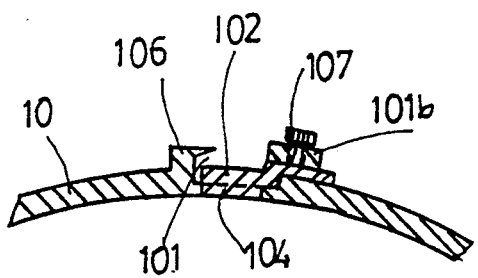
FIG. 22 is a sectional front view of a time scale on the celestial globe of the automatic tracking astronomical globe of the present invention.
Figure 21:
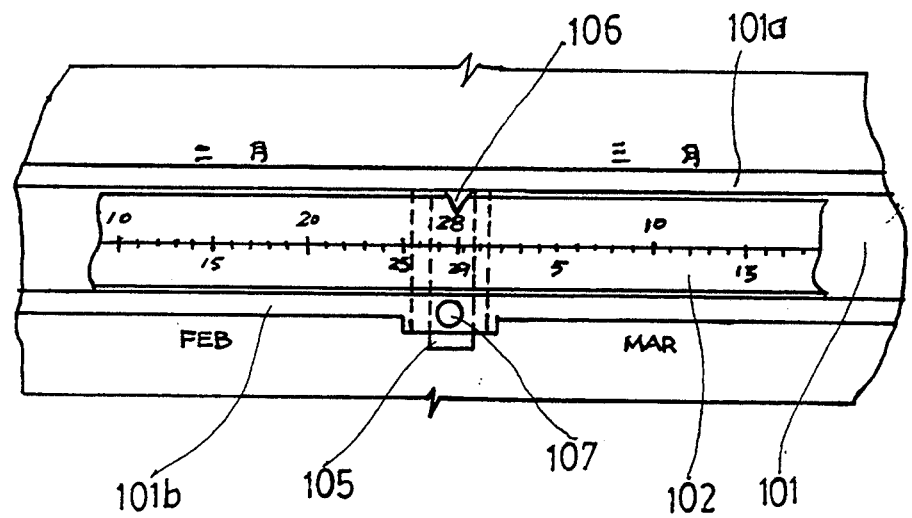
FIG. 21 is a top view of a time scale on the celestial globe of the automatic tracking astronomical globe of the present invention.

Referring to FIGS. 4, 21, 22, and 23, an annular solar groove 101 is formed on the circumferential outer surface of the celestial globe 10 along the path adjacent to the first and second ecliptic gear 96 and 97. An annular solar time scale 102 is rotatable disposed in the groove 101 and guided by two parallel annular ribs 101a and 101b which are protruded at the two parallel sides of the groove 101. The annular solar groove 101 has a guiding slot 103 (as shown in FIG. 23). A guiding stopper 104 is protruded from the under surface of the annular solar time scale 102 and inserted into the guiding slot 103.

The annular solar time scale 102 further comprises an adjusting bar 105. The adjacting bar 105 is extended from the annular solar time scale 102 at a position respective to the guiding stopper 104. A calender pointer 106 is formed on one of the ribs 101a. A screw 107 is screwed to the other rib 101b for pressing the adjusting bar 105 of the annular solar time scale 102 in position.

Since the date of the arriving of the four seasons is different in varying districts on the earth. We divides the annular solar time scale 102 into 365 and ¼ days and marks the date February 28 near the guiding stopper 104. Thus, we can move the adjusting bar 105 to left or right so as to move the guiding stopper 104 within the guiding slot for two days' amendment.

As can be seen in FIG. 3, two round drive boxes 90a and 90b, shaped roughly like the frustum of a cone, are disposed between celestial globe 10 and terrestial globe 20 in diametrically opposed positions, being 90 degrees apart from the positions of the vernal and autumnal equinoxes on the circle of the ecliptic of celestial globe 10, or in astronomical terms over the positions of the summer and winter solstices. Each round drive box 90a and 90b contains identical solar and lunar drive mechanisms.

Figure 18:
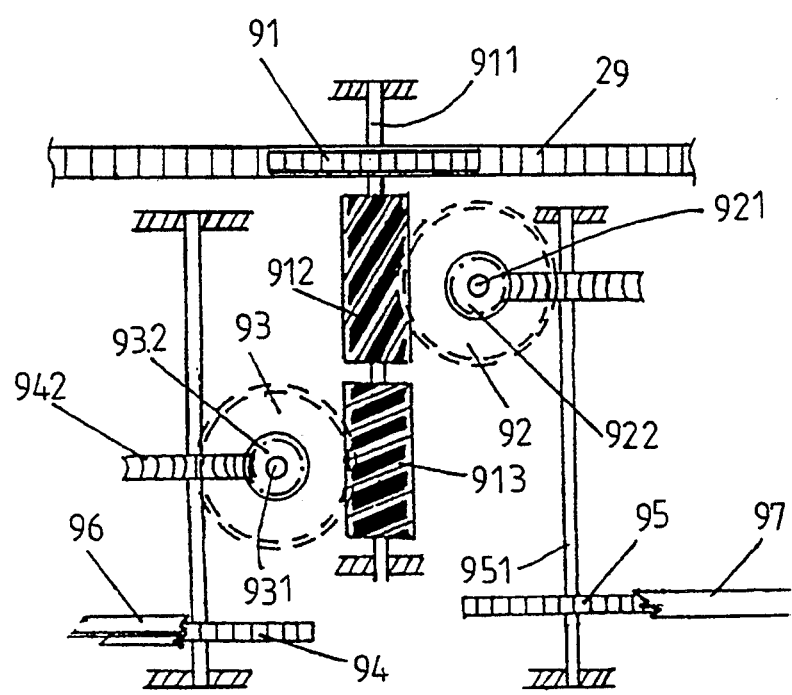
FIG. 18 is a top view of a solar and lunar drive mechanism of the automatic tracking astronomical globe of the present invention.
Figure 19:
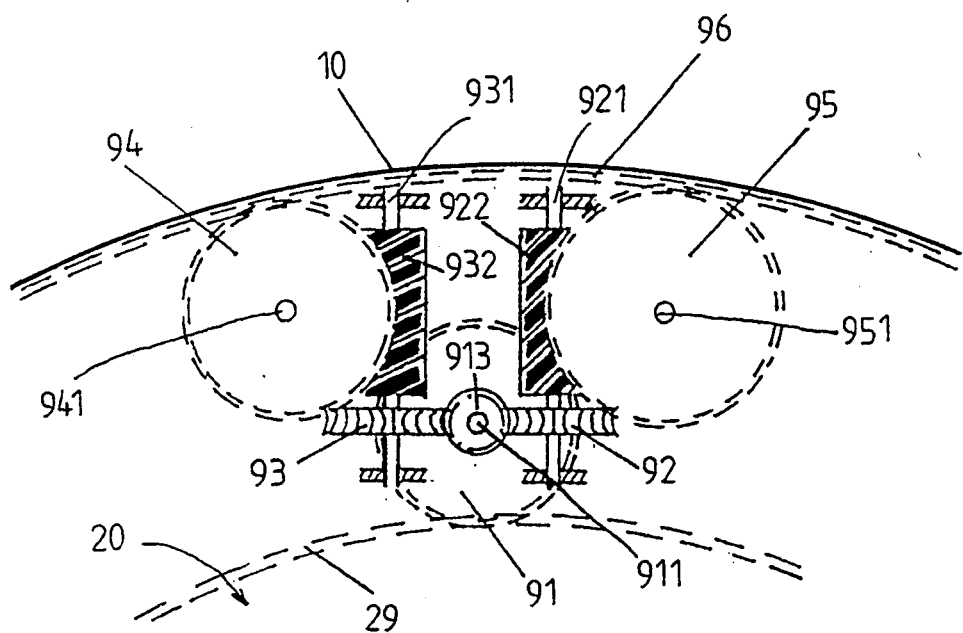
FIG. 19 is a front view of a solar and lunar drive mechanism of the automatic tracking astronomical globe of the present invention.
Figure 20:
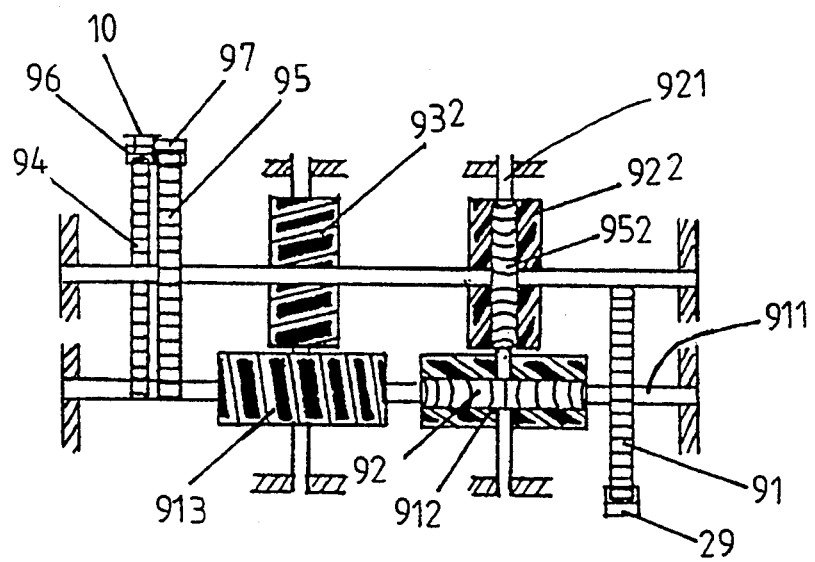
FIG. 20 is a side view of a solar and lunar drive mechanism of the automatic tracking astronomical globe of the present invention.

Referring to FIGS. 18, 19, and 20, the solar and lunar drive mechanism comprises a bevel type epicyclic gear 91 engaged with bevel type equatorial gear 29 formed around the equator of terrestial globe 20 (shown also in FIG. 5), a spur type solar drive gear 94 engaged with a spur type, annular, internally toothed first ecliptic gear 96, a spur type lunar drive gear 95 engaged with a spur type, annular, internally toothed second ecliptic gear 97, and a first and second set of coupling gears.

Epicyclic gear 91 assumes an angle of about 22.5 degrees with respect to equatorial gear 29, thus being parallel with the plane of the ecliptic circle of celestial globe 10.

First and second ecliptic gears 95 and 96 are juxtaposed to each other and have diameters slightly less than that of celestial globe 10. An inner circumferential bevel (not shown) formed on respective rims 13 and 14, of north celestial hemisphere 11 and south celestial hemisphere 12, rotatably secure first and second ecliptic gears 95 and 96 in position, parallel with and in proximity to the ecliptic circle of celestial globe 10.

Epicyclic gear 91 is secured near one end of a shaft 911, rotatably secured to the inner wall of drive box 90a. A first worm and a third worm 912 and 913 are also secured to shaft 911 with first worm 912 in a medial position between worm 913 and epicyclic gear 91.

A first worm gear 92 secured near one end of a shaft 921, rotatably secured to the inner wall of drive box 90 is engaged with worm 912. A second worm 922 is secured near the opposite end of shaft 921.

Lunar drive gear 95 is secured near the lower end of a shaft 951, rotatably secured to the inner wall of drive box 90a.

A second worm gear 942 is secured near the upper end of shaft 951 and engages second worm 922.

First worm 912, first worm gear 92, second worm 922, and second worm gear 942, together comprise the first set of coupling gears.

Third worm gear 93 secured near one end of a shaft 931, rotatably secured to the inner wall of drive box 90a is engage with worm 913. A fourth worm 932 is secured near the opposite end of shaft 931.

Solar drive gear 94 is secured near the lower end of a shaft 941, rotatably secured to the inner wall of drive box 90a. A fourth worm gear 942 is secured near the upper end of shaft 941 and engages fourth worm 932.

Third worm 913, third worm gear 93, fourth worm 932, and fourth worm gear 952, together comprise the second set of coupling gears.

Epicyclic gear 91 rotates as it revolves around the fixed equatorial gear 29, carried by the rotation of celestial globe 10 about terrestial globe 20.

Solar and lunar drive gears 94 and 95, engaged with epicyclic gear 91 through the respective first and second sets of coupling gears, affect the rotation of respective first and second ecliptic gears 96 and 97.

The drive ratio between equatorial gear 29 and epicyclic gear 91, solar drive gear 94 and first ecliptic gear 96, and the drive ratio of the first set of coupling gears have all been pre-determined to affect the rotation of first ecliptic gear 96 in a counter-clockwise direction, at the constant rate of one revolution per 366.261 revolutions of celestial globe 10, within a high degree of precision.

Likewise, the drive ratio between lunar drive gear 95 and second ecliptic gear 97, and the drive ratio of the second set of coupling gears have all been pre-determined to affect the rotation of second ecliptic gear 97 in a counter-clockwise direction, at the constant rate of one revolution per 27.398 revolutions of celestial globe 10, within a high degree of precision.

Thus, with celestial globe 10 rotating once per sidereal day, first ecliptic gear 96 rotates once in a sidereal year and second ecliptic gear 97 rotates once in a sidereal month.

Figure 24:
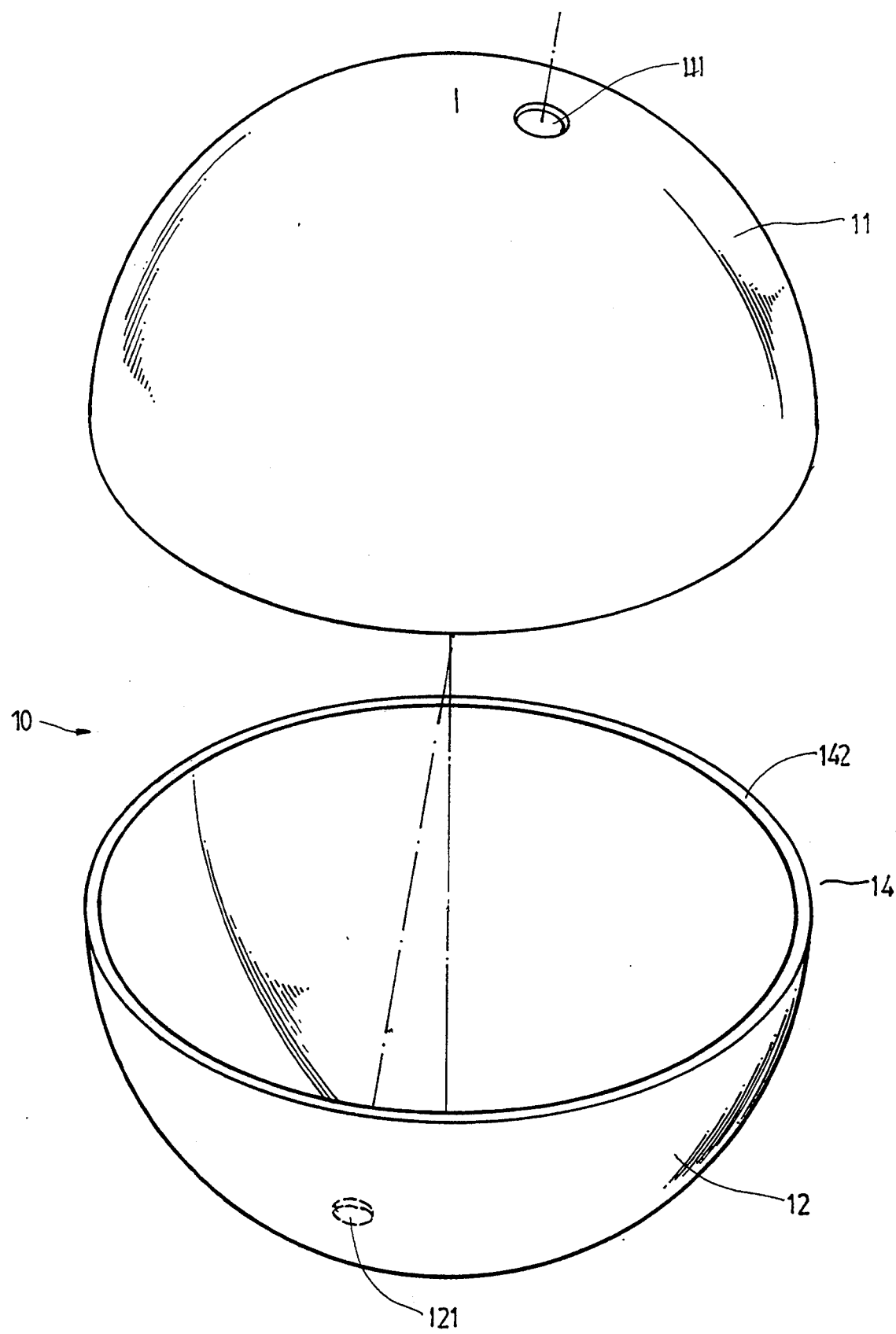
FIG. 24 is an exploded perspective view of a celestial globe of the of the automatic tracking astronomical globe of the present invention.
Figure 25:
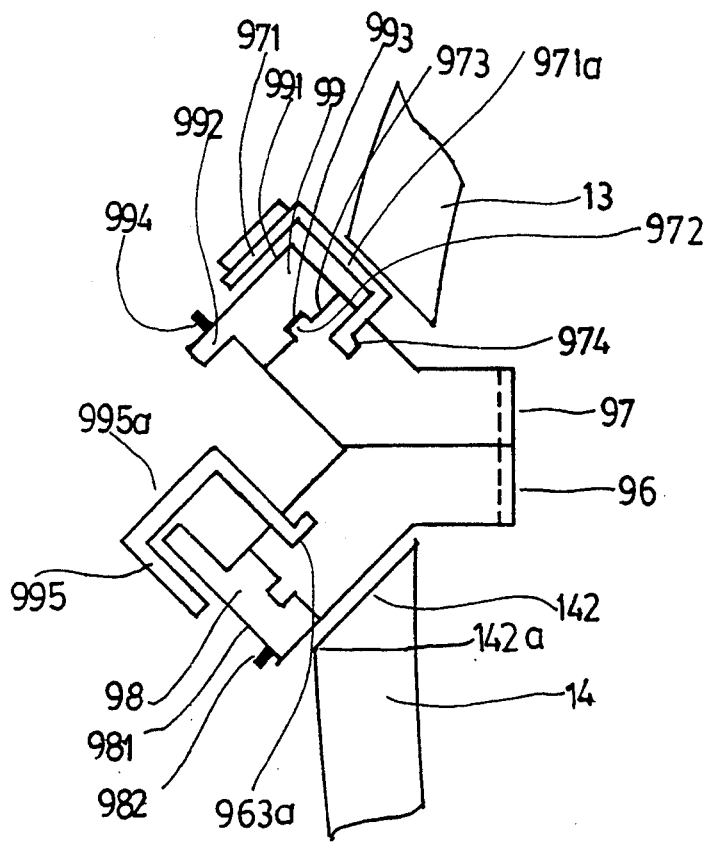
FIG. 25 is a sectional end view of a celestial globe in the vicinity of the ecliptic circle thereon showing a lunar marker and a solar marker disposed over a lunar calender band and a solar calender band, respectively, of the automatic tracking astronomical globe of the present invention.

Referring to FIGS. 24 and 25, an annular solar calender band 98, with a circumferential outer face 981 and a positioning tab 982 formed thereon, is rotatably secured in a counter-sunk outer rim 142 formed on the outer periphery of rim 14. An annular lunar calender band 99 with an outer circumferential face 991, and a beveled inner flange 992 is rotatably secured to second ecliptic gear 97.

An annular protruding guide 972, formed in a central position around a beveled upper face 973 of the outer rim of first ecliptic gear 96, is disposed within an annular recessed track 993 formed in a central position around the base of inner flange 992.

Lunar calender band 99 can be manually rotated about first ecliptic gear 96 by manipulating a tab 994, protruding from the lower edge of outer face 991. Track 993 maintains sufficient static friction with guide 972 to enable the commensurate rotation of lunar calender band 99 with second ecliptic gear 97.

A lunar marker 971 with a geniculated securing arm 971a is rotatably secured to second ecliptic gear 97. Lunar marker 971 is disposed over the outer face 991 of lunar calender band 99, with securing arm 971a extending through the gap between rim 13 and lunar calender band 99 to enter groove 974, with an L-shaped cross-section, formed around the outer periphery of second ecliptic gear 97.

Lunar marker 971 can be manually slid to desired radial position around lunar calender band 99. Securing arm 971a maintains sufficient static friction with groove 974 to enable the commensurate rotation of lunar marker 971 with second ecliptic gear 97.

A solar marker 995 with a geniculated securing arm 995a is disposed over the outer face 981 of solar calender band 98. Securing arm 995a extends through the gap between lunar calender band 99 and solar calender band 98 to enter a groove 963a, with an L-shaped cross-section, formed around a beveled lower face 963 of the outer rim of first ecliptic gear 96.

Solar marker 995 can be manually slid around solar calender band 98 to a desired radial position thereon, with securing arm 995a maintaining sufficient static friction with groove 963a to enable the commensurate rotation of solar marker 995 with lunar calender band 99.

Figure 26:
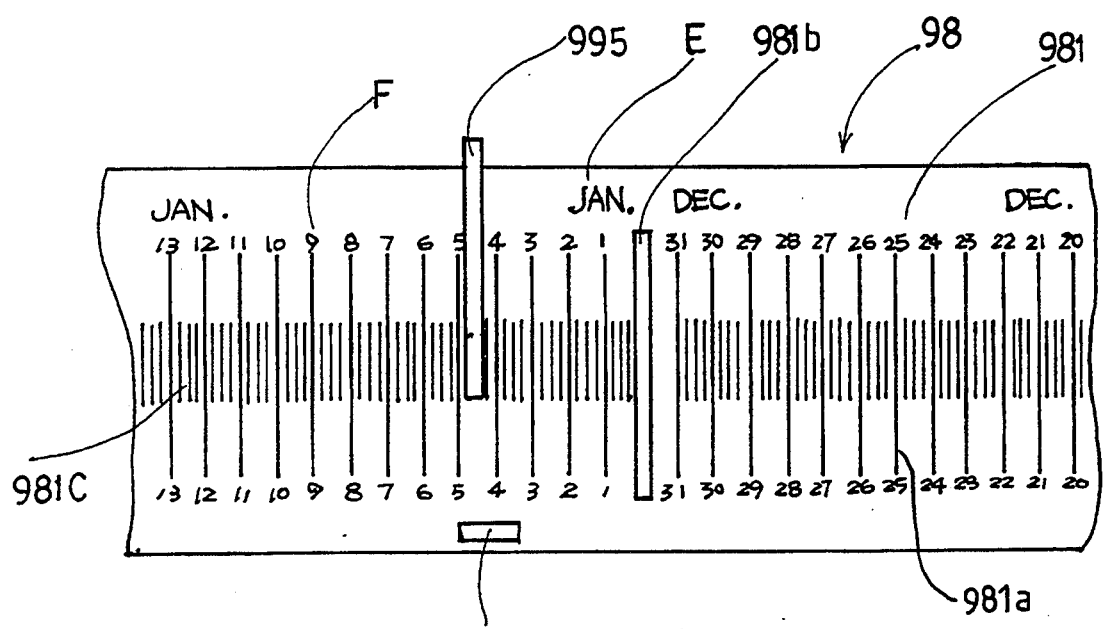
FIG. 26 is a sectional front view of a solar calender band of the automatic tracking astronomical globe of the present invention.

A sequence of equally spaced delimiting lines 981a are formed around the circumference of outer face 981 of solar calender band 98, each extending perpendicularly from the lower edge thereof. The distance between two adjacent delimiting lines 981a along the circumference of outer face 981 is traversed by solar marker 995 in the period of a 24 hour civil day, as shown in FIG. 26.

A plurality of letters and numerals formed above and between delimiting lines 981a denote the months E and dates F of a Gregorian calender, beginning with January 1 and extending to December 31 in a counter-clockwise direction around outer face 981. Each delimiting line 981a represents the time of 12 midnight of the day corresponding with the data numeral to the left, or equivalently to the beginning of the day corresponding with the date numeral to the right.

The dates January 1 and December 31 are separated by a space bar 981b of a width corresponding to 0.256 civil days, in terms of the period of time required by solar marker 995 in traversing the distance.

The space is accounted for, of course, by the difference between a 365 day civil year and the 365.256 civil day sidereal year, which is the period required for solar marker 995 to complete one revolution about solar calender band 98, as was described above.

Upon the arrival of New Year's Eve a user could rotate solar calender band 98 in a clockwise direction, by manipulating positioning tab 982, protruding perpendicularly from the lower edge thereof, so that solar marker 995 is aligned with the beginning of the date January 1. In this fashion, no loss of time occurs. Furthermore, the date February 28 is also numbered for the date February 29. On a leap year, on the arrival of March 1, a user could rotate solar calender band 98 in a counter-clockwise direction, in the same fashion as was described above, so as to align solar marker 995 with the previous delimiting line 981a, which then represents the beginning of February 29.

Three equally spaced graduation lines 981c are formed between adjacent delimiting lines 981a, dividing each data into four 6 hour intervals. The purpose of graduation lines 981b are not, however, primarily for time indication but for the purpose of initial positioning of solar marker 995 along the circle of the ecliptic of celestial globe 10, to be discussed below.

Figure 27:
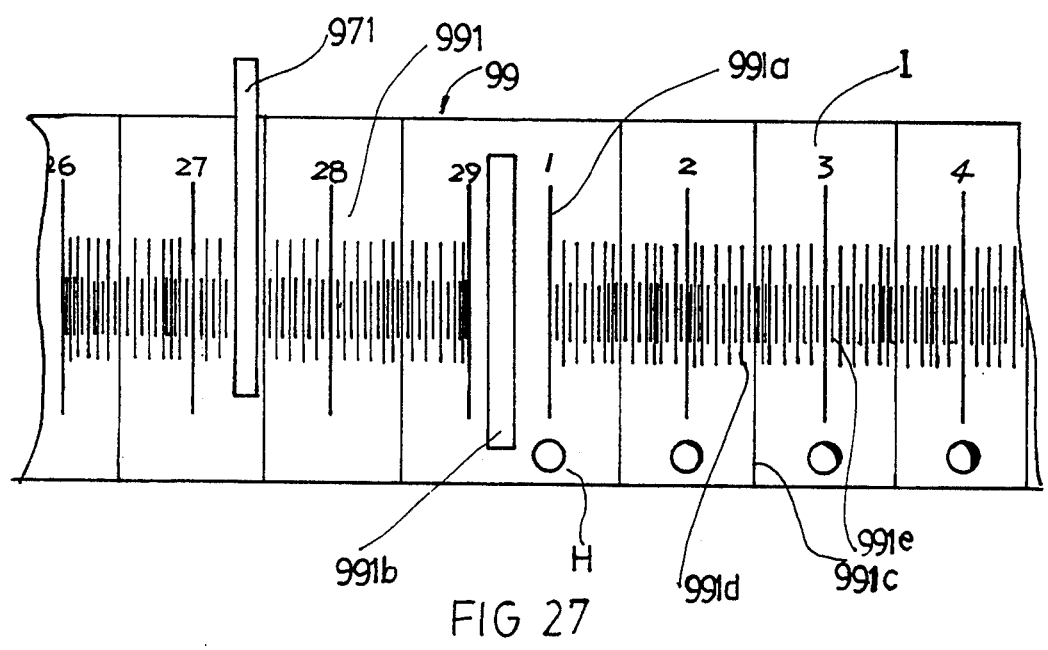
FIG. 27 is a sectional front view of a lunar calender band of the automatic tracking astronomical globe of the present invention.
Figure 11:
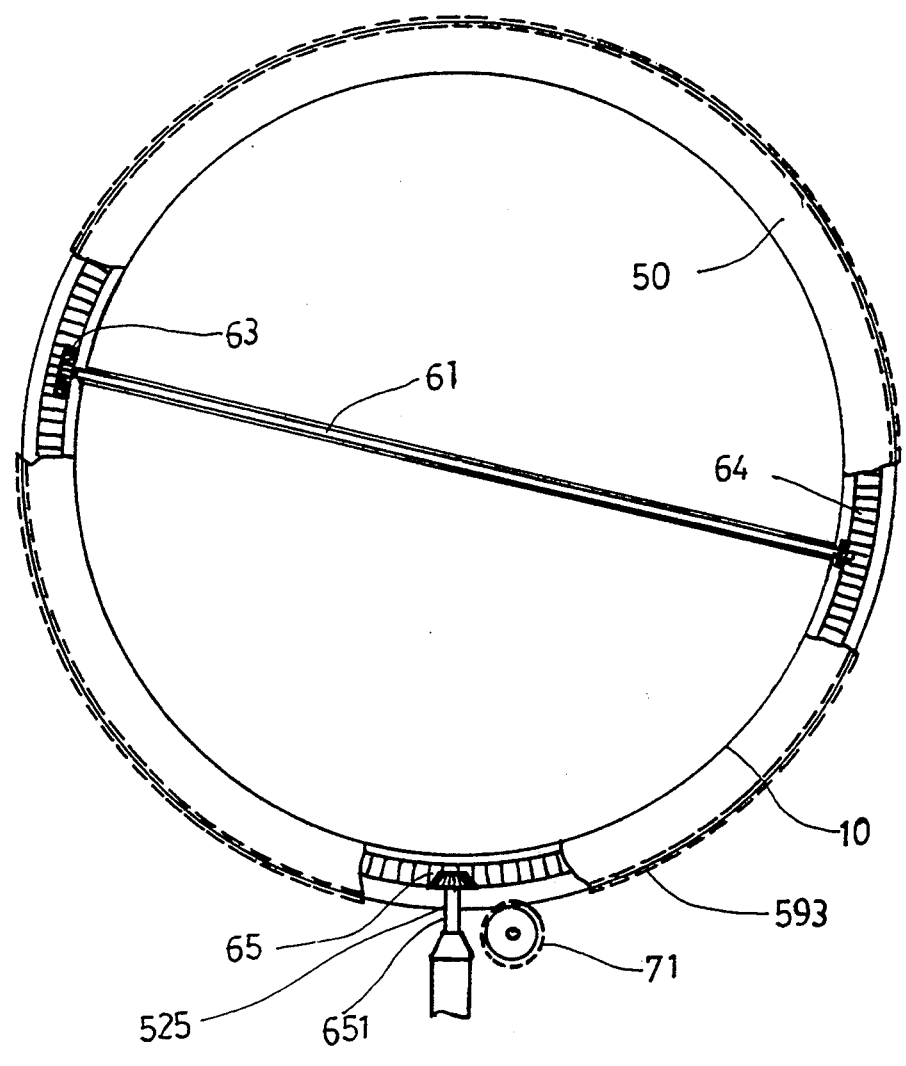
FIG. 11 is a frontal cut-away view of a globe rotation drive mechanism and latitude adjustment mechanism of the automatic tracking astronomical globe of the present invention.

A sequence of astronomical symbols H, as in FIG. 27, are formed at pre-determined positions around the circumference of the outer face 991 of lunar calender band 99, representing the phases of the moon. Symbols H begin with a symbol representing a new moon, ascend through a series of symbols leading to a full moon, and degrees back to the symbol representing the new moon.

As lunar marker 971 rotates around the circle of the ecliptic of celestial globe 10, in a counter-clockwise direction, at the rate of one revolution per 27.398 sidereal days, and lunar calender band 99 rotates about the circle of the ecliptic, also in a counter-clockwise direction at the rate of one revolution per 366.261 sidereal days, as stated above, the relative rotational speed between lunar marker 971 and lunar calender band 99 is less than the sidereal monthly rate, with lunar marker 971 completing one revolution relative to a fixed point on lunar calender band 99 in the period of approximately 29.502 civil days. This figure is a close approximation of the synodic month with a length of approximately 29.531 civil days.

Hence, the lunar phase symbol H aligned with or in proximity to lunar marker 971 gives an accurate indication of the moon's phase at the time of observation.

A user can periodically re-position lunar calender band 99 by manipulating positioning tab 994 to correct cumulative errors.

A sequence of equally spaced delimiting lines 991a are also formed around the circumference of outer face 991, each extending perpendicularly between the upper and lower edges thereof. Delimiting lines 991a represent the midnight times of dates on the Chinese lunar calender, with a corresponding date number I being formed to the right of each delimiting line 991a. The delimiting line 991a to the left of each date number I corresponds to the midnight time of the previous date.

The distance between two adjacent delimiting lines 991a is traversed by lunar marker 971 in the period of one civil day. However, the midnight position of the 29th of the lunar month and the position of the beginning of the 1st of the lunar month, as represented on lunar calender band 99, are separated by a space band 991b.

Space band 991b has a width equivalent to 0.502 times the distance separating adjacent delimiting lines 991a, with lunar marker 971 requiring 0.502 civil days to traverse space band 991b.

The astronomical symbol H representing the new moon is in a medial position, between space band 991b and the delimiting line 991a, representing midnight of the 1st of the lunar month. As was stated in the background above, the first of the month on the Chinese lunar calender always has a new moon, and a full moon always falls on the fifteenth of the month. Accordingly, the astronomical symbol H representing the full moon is in a medial position, between the delimiting line 991a representing midnight of the 15th of the lunar month and the delimiting line 991a representing midnight of the previous date.

The data corresponding to the 29th of the lunar month is also numbered for the 30th of the lunar month. For a long month on the Chinese lunar calender having 30 days, upon the conclusion of the 29th of the lunar month, a user could rotate lunar calender band 99 in a counter-clockwise direction, by manipulating positioning tab 994, so as to align the previous delimiting line 991a with lunar marker 971, which would then represent the beginning of the 30th of the lunar month.

At the conclusion of the 29th day of a short lunar month or the conclusion of the 30th day of a long lunar month, a user could rotate lunar calender band 99 in a clockwise direction, in the manner described above, so that lunar marker 971 crosses space band 991b to align with the opposite edge thereof, corresponding to the beginning of the 1st day of a lunar month.

A mid-day line 991c is disposed in a central position between each pair of adjacent delimiting lines 991a, extending perpendicularly from the lower edge of outer face 991, dividing each date into two 12 hour periods with a mid-day line 991c representing the noon time of a corresponding date.

A plurality of equally spaced hour lines 991d, disposed to either side of each mid-day line 991c, further divide a date into 24 one hour periods. A half-hour line 991e is centrally disposed between each adjacent pair of hour lines 991d, and between an hour line 991d and adjacent mid-day line 991c or delimiting line 991a, to define half-hour intervals.

Hour lines 991d have a medial height relative to mid-day lines 991c and half-hour lines 991e, with mid-day lines 991c being the longest.

As both the Chinese lunar calender and Gregorian calender use concurrent 24 hour civil days, with solar marker 995 aligning with a delimiting line 981a at the same time as lunar marker 971 aligns with a delimiting line 991a, the finer time gradations of lunar calender band 99 can also be used to indicate the diurnal time of a date on solar calender band 98 to a higher degree of precision than on the latter.

Chinese characters, not shown, disposed over corresponding dates F on the outer surface 981 of solar calender band 98, designate the 24 fortnightly periods of the Chinese lunar calender. The fortnightly periods coincide with dates on the Gregorian calender that have intervals of 14 to 16 days, with the exact date of a fortnightly period varying by as much as a day from year to year. As such, the 24 fortnightly periods represented by chinese characters on solar calender band 98 are positioned over mean dates. The fortnightly period beginning on December 22, translated to english, represents the winter solstice, and the fortnightly period beginning January 6 represents the "lesser cold".

Figure 32:
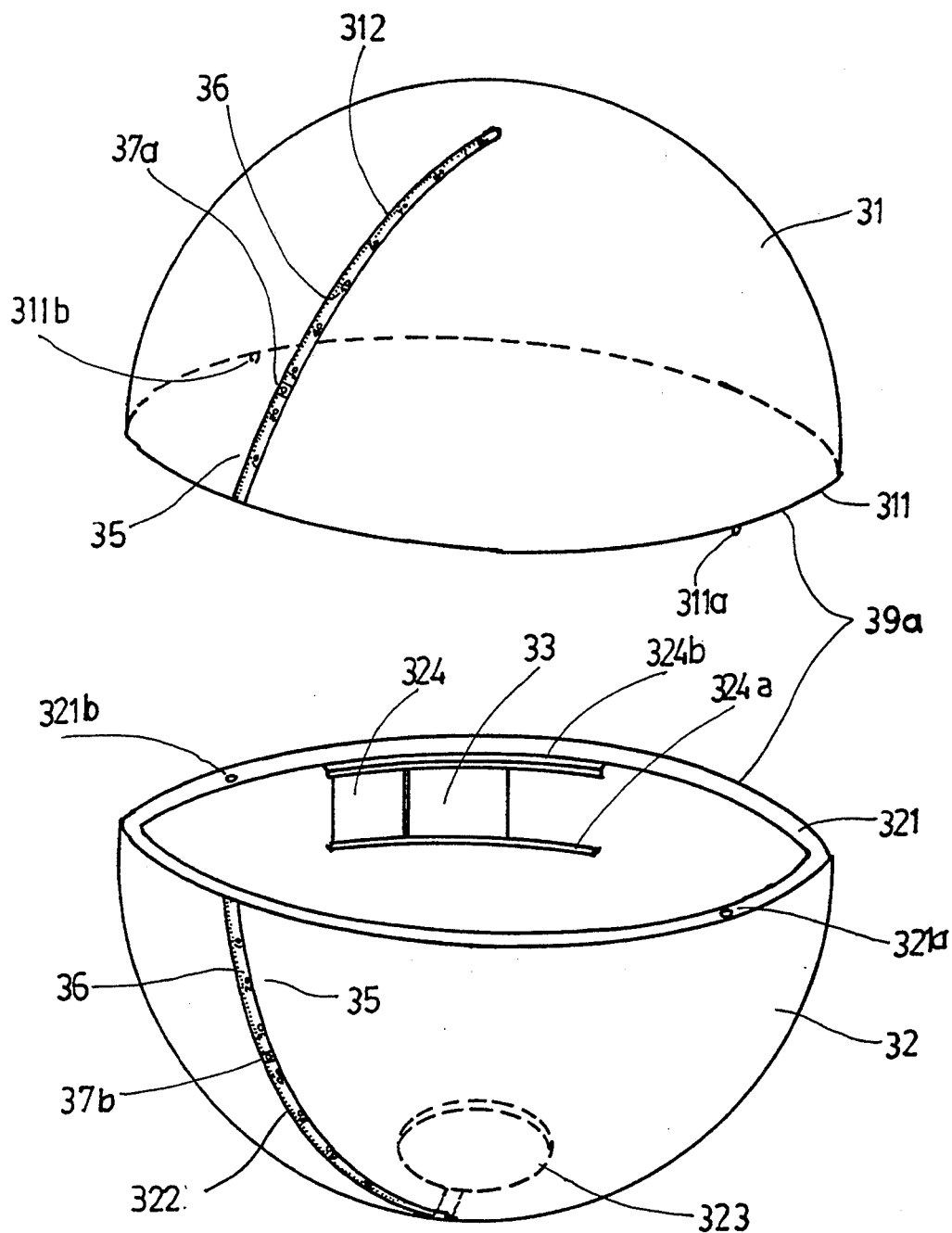
FIG. 32 is an exploded perspective view of a horizon sphere of the automatic tracking astronomical globe of the present invention.

Referring to FIG. 32, a horizon sphere 30 comprises an upper horizon hemisphere 31 and a lower horizon hemisphere 32. Upper and lower horizon hemispheres 31 and 32 have respective diametrical rims 311 and 321. A circular support hole 323 is formed on the lower portion of lower horizon hemisphere 32, parallel with circular rim 321.

A pair of pins 311a and 311b protrude downward from rim 311 of hemisphere 31, disposed at diametrically opposed positions, and a pair of cylindrical recesses 321a and 321b are formed on rim 321 of hemisphere 32, disposed at diametrically opposed positions.

A channel 312 is formed along a diametrical arc of upper horizon hemisphere 31, extending perpendicularly from rim 311 to proximity to the uppermost point of hemisphere 31. Similarly, a channel 322 is formed on lower horizon hemisphere 32, extending perpendicularly from rim 321 to the rim of support hole 323.

Horizon sphere 30 envelopes annular frame 50 and aximuth circle 39, with the peripheral portion of support hole 323 resting against an annular supporting flange 42, disposed around the upper portion of mount 40. Upper horizon hemisphere 31 is positioned over lower horizon hemisphere 32 with rim 311 abutting rim 321, and pins 311a and 311b inserted into respective recesses 321a and 321b. Channels 312 and 322 are aligned so as to define a continuous elevation track 35.

Markings formed to either side of channels 312 and 322 define an elevation scale 36 with units of degrees.

Horizon sphere 30 is concentric with celestial globe 10 and abuts the outer peripheral rim 39a of azimuth circle 39, with circular rims 311 and 321 lying on the same plane as azimuth circle 39.

A transparent sliding door 33 is slidingly secured to a pair of rails 324a and 324b, disposed on respective parallel upper and lower sides of an aperture 324, formed on lower hemisphere 32 in proximity to rim 321 thereon. A user can position celestial globe 10 by first inserting his or her hand through aperture 324, or similarly position terrestial globe 20 after first rotating horizon sphere 30 to bring aperture 324 near rotation knob 241, without having to remove upper hemisphere 31.

Figure 33:
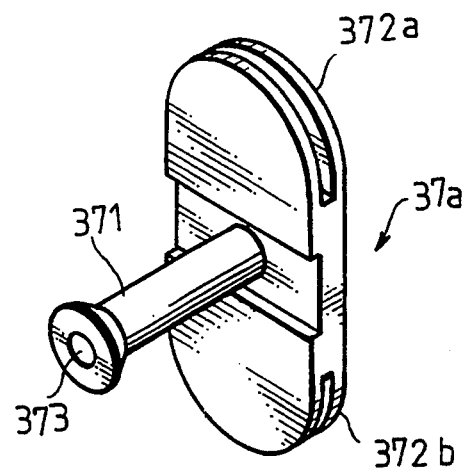
FIG. 33 is a perspective view of an indexer of the automatic tracking astronomical globe of the present invention.

Referring also to FIG. 33, indexers 37a and 37b are slidingly secured to elevation track 35, with indexer 37a disposed above azimuth circle 39 and indexer 37b disposed below azimuth circle 39. Indexer 37a or 37b comprises a cylindrical body 371, with a pair of clamps 372a and 372b formed on either side thereof, and a peep hole 373 formed through the axis of body 371.

By rotating horizon sphere 30 about supporting flange 42 and sliding indexer 37a or 37b along elevation track 35, indexer 37a or 37b can be aligned over a celestial object represented on celestial globe 10 as viewed through peep hole 373.

The marking on azimuth scale 395 aligned with elevation track 35 indicates the azimuth angle of the celestial object aligned with indexer 37a or 37b, relative to the user's location at the time of observation. The marking on elevation scale 36 aligned with the indexer, 37a or 37b, positioned over the celestial object, indicates the corresponding elevation angle, relative to the user's location at the time of observation.

Indexers 37a and 37b can also be aligned over solar marker 995 or lunar marker 971 to find the local horizon co-ordinates of the sun or moon, respectively, at the time of observation.

To facilitate the proper orientation of the polar axis, i.e. polar axle 61, of celestial globe 10 relative to annular frame 50, for the latitude of a user's location, a latitude scale 53, as shown in FIG. 12, is formed around the outer face of the front wall of annular frame 50, with units of degrees and minutes, and a latitude indicator 54 is secured to polar axle 61, disposed between the north celestial pole of celestial globe 10 and polar axle bearing 595.

Figure 34:
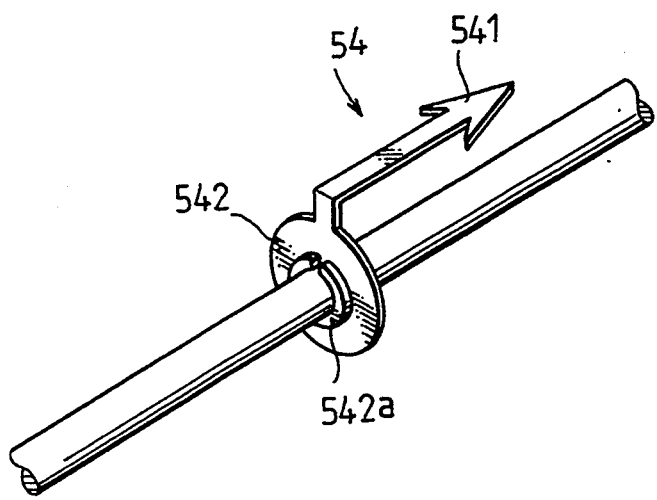
FIG. 34 is a perspective view of an latitude indicator of the automatic tracking astronomical globe of the present invention.

Latitude indicator 54 is shown in FIG. 34, comprising a pointer 541 adjoining with a securing eyelet 542 through a right angle bend, and secured to polar axle 61 with a pair of retaining rings 542a.

Celestial globe 10 is positioned to a correct orientation by turning decoupling knob 812 to engage the latitude adjustment mechanism, as was described above, and rotating latitude adjustment knob 733 in a efficient direction until pointer 541 of latitude indicator 54 is aligned with the mark on latitude scale 53 corresponding to the latitude of the user's location.

By tightening locking screw 55, the orientation of the polar axis of celestial globe 10 with respect to annular frame 50 is secured.

Annular solar time scale 102 is then slid within annular solar groove 101 to align calender pointer 106 over sidereal solar time scale 102 on celestial globe 10, and secured in place by tightening screw 107.

A local sidereal time can be calculated from the local date and civil time, and the longitude of the user's location. Celestial globe 10 is then rotated about polar axle 61 to bring the marking on sidereal calender band 102, corresponding to the calculated local sidereal time, in alignment with pointer 106.

Synchronous drive can then be initiated by setting power switch 472 to an On position.

Solar marker 995 and lunar marker 971 are properly positioned along the circle of the ecliptic of celestial globe 10, to correspond with the actual positions of the sun and moon on the celestial sphere at the time of setting, with the aid of solar calender band 98 and lunar calender band 99.

Solar calender band 98 is first rotated about celestial globe 10 to align a first salient pre-designated position thereon, such as an edge of space bar 981b, with a fiducial mark 142a formed in proximity to the lower edge of outer rim 142 of south celestial hemisphere 12, as shown in FIG. 24. Lunar calender band 99 is then rotated to align a salient, pre-designated position, thereon, such as an edge of space band 991b with a similar second predesignated position on solar calender band 98.

A proper initial position for solar marker 995 relative to solar calender band 98, as mensurated by date delimiting lines 981a and graduation lines 981c, can be calculated or converted from time referenced equatorial co-ordinates of the sun provided in various publications, as was mentioned in the summary.

Likewise, the proper initial position of lunar marker 971 relative to lunar calender band 99, as mensurated by the date, mid-day, hour, and half-hour delimiting lines thereon, can be similarly derived.

Finally, after solar marker 995 and lunar marker 971 have been properly positioned along the circle of the ecliptic of celestial sphere 10, solar calender band 98 can be rotated to align the correct date F thereon with solar marker 995, corresponding to the local date. With the aid of graduation lines 981c, solar calender band 98 can be finely positioned relative to solar marker 995, within a six hour interval based on the local time.

Lunar calender band 99 can be properly positioned by aligning an astronomical symbol H thereon with lunar marker 971 or interpolating a position between adjacent astronomical symbols H, corresponding with the actual lunar phase at the time of setting.

Alternately, the correct date I on lunar calender band 99, corresponding to the actual date on the Chinese lunar calender as determined from a chinese almanac, can be aligned with lunar marker 971, over the mid-day line 991c, an hour line 991d, or a half-hour line 991e, in accordance with the local time.

With the aid of compass 43, annular frame 50 can be aligned parallel with the north-south direction, i.e. the plane of the local meridian, so that a line passing through the center of celestial globe 10 and any celestial object represented thereon points directly to the actual position of the celestial object in the sky. A quick visual reference of celestial globe 10 would thus indicate the general direction of a celestial object, greatly aiding naked eye viewing.

Figure 29:
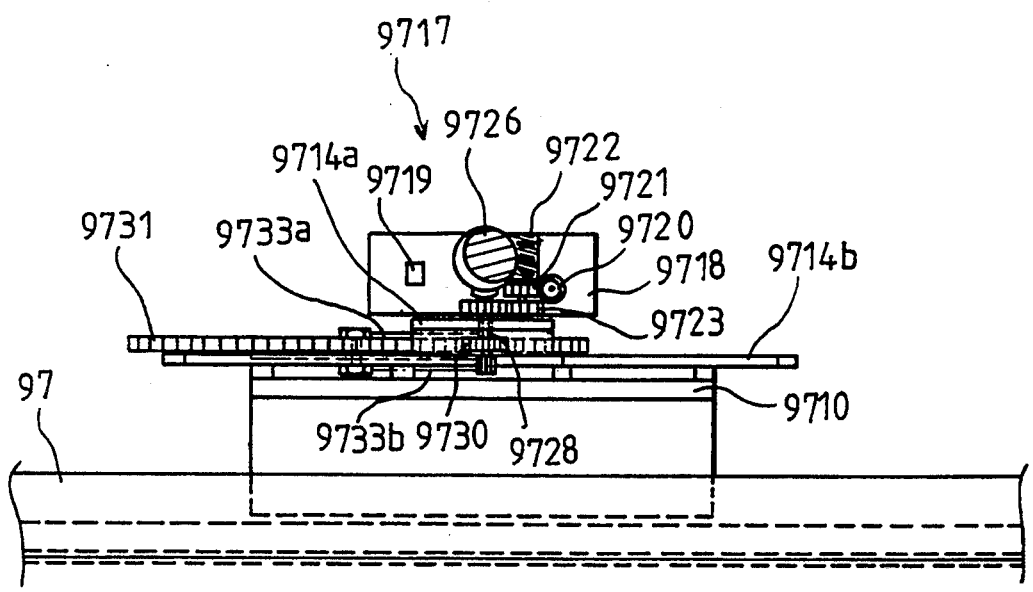
FIG. 29 is a sectional left end view of FIG. 28 of the automatic tracking astronomical globe of the present invention.

Referring to FIG. 28 to 31, shows another embodiment of the lunar marker 971 of the present invention. Since the center of the the lunar marker 971 and the actual moon position has an average error of about five degrees. The lunar marker 971 can provide amendment function. The lunar marker 971 comprises a base 9710 of L-shaped having a horizontal slidably inserted into an inclined groove 9713 formed along the top surface of the second ecliptic gear 97, as shown in FIG. 29.

A case bottom 9714a and a sliding board 9714b with a longitudinal sliding slot 9715 and a latitudinal sliding slot 9716 is secured on the horizontal portion 9711 of the base 9710. A quartz controlling device 9717 comprises a quartz controlling motor, a power source, a quartz controlling circuit and a set of decelerating gears (not shown) incorporating in a case 9718 which is mounted on the case bottom 9714a. The quartz controlling device 9717 further comprises a switch 9719 for controlling the clockwise and anticlockwise rotation and high-speed rotation, and an output worm 9720 extending out of the case 9718 and rotating in constant speed. The output worm 9720 drives a first worm gear 9721 to rotate in constant speed. A second worm 9722 and a driving gear 9723 are coaxially disposed on the upper and lower ends of the first worm gear 9721 respectively, as shown in FIG. 25). In which, the second worm 9722 drives a second worm gear 9724 to rotate. The second worm gear 9724 is mounted on a moon driving shaft 9725 which is connected to a moon sphere 9726. The moon sphere 9726 is driven to rotate at predetermined speed at the same time, as shown in FIG. 27.

By providing proper teeth rotio of the output worm 9720, and second worm gear 9724, the moon sphere 9726 can be driven to rotate one cycle for every 29.53 days. Half the surface area of the moon sphere 9726 is shaded, so that it can demonstrate the new moon or full moon during rotation.

The driving gear 9723 engages and drives a first gear 9727 and its moon shaft 9728, which one end is connected to the moon sphere 9726, to rotate. A frame 9729 is extended from case 9718 to support the moon sphere 9726 and to keep the moon sphere 9726 and moon shaft 9728 coaxially connected.

Figure 30:
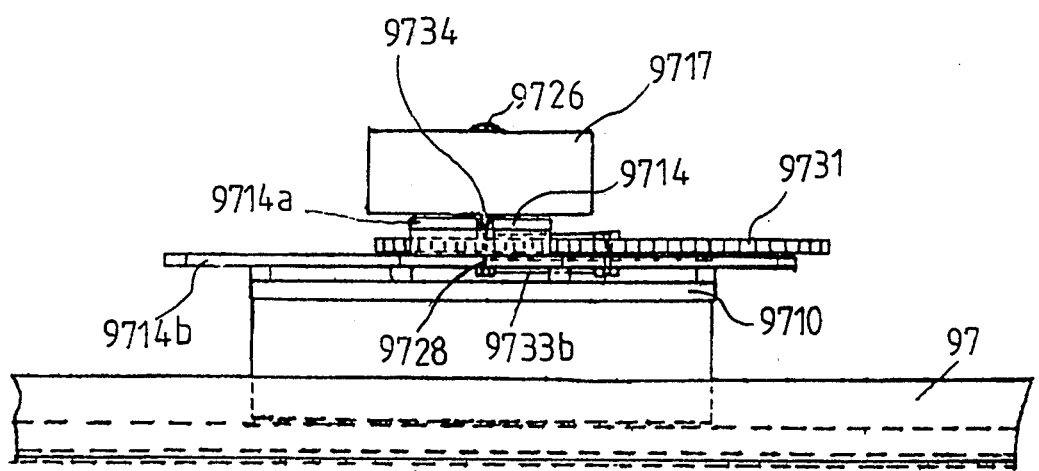
FIG. 30 is a sectional right end view of FIG. 28 of the automatic tracking astronomical globe of the present invention.
Figure 31:
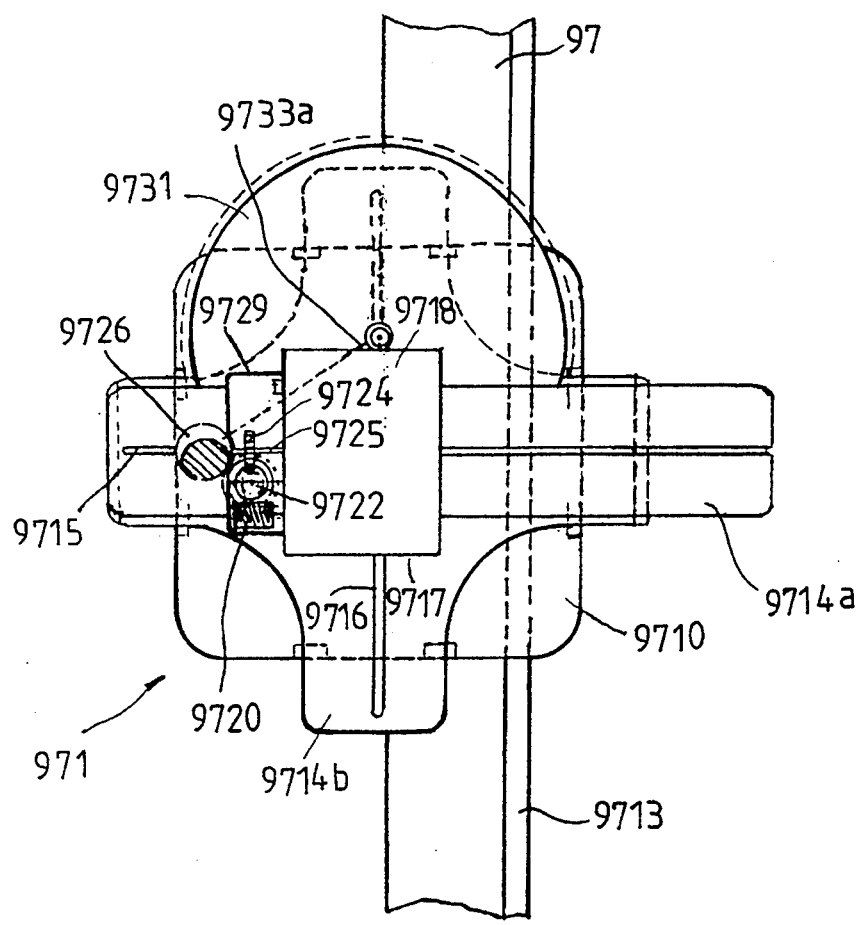
FIG. 31 is a top view of FIG. 28 of the automatic tracking astronomical globe of the present invention.

The rotation of the moon shaft 9728 drives a second gear 9730 to rotate. The second gear 9730 is connected to the lower end of the moon shaft 9728 and engaged with a third gear 9731 which is held to the latitudinal sliding slot 9716 of the sliding board by a supporting beam 9732a. Thus, the third gear 9731 will move along the latitudinal sliding slot 9716 when it is driven by the second gear 9730 without any rotation. An upper guide rod 9733a and a lower guide rod 9733b are mounted above and below the third gear 9731 respectively, in order to guide the linear movement of the third gear 9731 along the latitudinal sliding slot 9716, so as to push the second gear 9730 and the moon shaft 9728 to move along the longitudinal sliding slot 9715. Also, the case 9718 will be forced to slide along the longitudinal connecting beam 9734 (as shown in FIG. 30) which is provided under the case 9718 and pushed by the frame 9729. At the same time, the moon sphere 9726 will also move along the longitudinal sliding slot 9715 by means of the connection of the moon driving shaft 9725. Accordingly, the moon sphere 9726 can move perpendicularly to the solar calender band 98 for five degrees form south to north for every 27 days and 5 hours and 5 minutes and 36 seconds when proper gears ratios are provided.

While the above description contains many specificities, these should not be interpreted as limitations on the scope of the present invention, but merely as one mode of actualization of the preferred embodiment thereof. Accordingly, the scope of the invention should not be determined by the above exposition but by the appended claims.

I claim:

1. An automatic tracking astronomical globe comprising a mount with a base disposed on its bottom portion, an annular frame with an open inner periphery secured to the top portion of said mount in a vertical position, an azimuth circle secured perpendicularly across a diameter of said annular frame in a horizontal position, and a celestial globe with an enclosed, concentric terrestial globe disposed concentrically within said annular frame and said azimuth circle, wherein:

said terrestial globe has lines, lettering, and artwork formed on its surface denoting nations, bodies of water, borders, and other features as found on a conventional earth globe;

said celestial globe is made from a transparent material and has points, lines, lettering, and other features formed on its outer surface denoting stellar constellations and prominent celestial objects;

marking formed around the periphery of said annular frame, on one face thereof, define a latitude scale with units of degrees;

an annular polar axle yoke is rotatably secured within said annular frame in a concentric position;

a polar axle extends through the north and south celestial poles of said celestial globe, and through the north and south poles of said terrestial globe, with one end thereof rotatably secured to a first bearing and the opposite end thereof rotatably secured to a second bearing, said first bearing and said second bearing are secured to said polar axle yoke at diametrically opposed positions, with said first bearing disposed opposite the north celestial pole of said celestial globe and said second bearing disposed opposite the south celestial pole of said celestial globe;

said polar axle is engaged with said celestial globe by a clutch means secured to the region of the north celestial pole of said celestial globe, said clutch means allows manual rotation of said celestial globe;

a concentric sleeve covers a major portion of the length of said polar axle, with one end of said sleeve extending from and securing to the north pole of said terrestial globe, passing through the south pole thereof, the opposite end of said sleeve securing to the rotating block of a friction bearing, said friction bearing being disposed between the south celestial pole of said celestial globe and said second bearing, the fixed block of said friction bearing is disposed to the rear of said rotating block opposite said second bearing and is secured to said polar axle yoke, a knurled rotation knob is secured to the front of said rotating block and protrudes from the open inner periphery of said annular frame enabling manual rotation of said terrestial globe;

a rotation means, including a motor and an output shaft, are disposed within the lower portion of said mount;

said celestial globe is rotated by said rotation means by means of a globe rotation drive mechanism comprising a polar axle gear secured to one end of said polar axle in proximity to said first bearing, a ring gear rotatably secured within said polar axle yoke in a concentric position, a drive gear having a shaft secured thereto rotatably secured to the bottom portion of said annular frame with the shaft of said drive gear extending through the bottom thereof into said mount, and a clutch means disposed within said mount between the shaft of said drive gear and the output shaft of said rotation means;

said clutch means engages the output shaft of said rotation means with the shaft of said drive gear when engaged by a decoupling and raising mechanism, said drive gear being engaged with said ring gear and said ring gear being engaged with said polar axle gear;

a circumferential gear is formed around the outer periphery of said polar axle yoke, a coupler gear rotatably secured within said mount engages said circumferential gear through an opening formed on the bottom portion of said annular frame, a worm gear disposed within said mount is secured to a common shaft with said coupler gear;

a worm, disposed within said mount and secured to a shaft with one end thereof pivotably secured to an inner wall of said mount and the other end extending through a slot formed on the outer wall of said mount to secure to an external latitude adjustment knob, is engaged with said worm gear when pivoted upwards by means of said decoupling and raising mechanism, enabling said polar axle yoke to be rotated about an axis perpendicular with said annular frame by manually rotating said tilt adjustment knob;

said decoupling and raising mechanism disengages said clutch means, between said output shaft and said drive gear shaft, when raising said worm to engage said worm gear, and engages said clutch means when said worm gear is lowered;

a plurality of gear teeth are formed around the equatorial circle of said terrestial globe defining an equatorial gear thereon;

said celestial globe is formed in two halves, in a north celestial hemisphere and a south celestial hemisphere, the circular rims of said north and south celestial hemispheres are parallel with and in proximity to the ecliptic circle of said celestial globe, said north and south celestial hemispheres being separated by a small gap;

a first thin, annular, internally toothed ecliptic gear and a second thin, annular, internally toothed ecliptic gear both have a diameter nearly equal with that of said celestial globe, said first ecliptic gear and said second ecliptic gear being rotatably secured within said gap between said north and south celestial hemispheres, with said second ecliptic gear being disposed between said first ecliptic gear and said north celestial hemisphere;

a pair of drive boxes are secured to the inner surface of said celestial globe at diametrically opposed positions, each said drive box having a similar solar and lunar drive mechanism disposed within;

each said solar and lunar drive mechanism comprises an epicyclic gear engaged with said equatorial gear, a first set of coupling gears and a second set of coupling gears, a solar drive gear engaged with said first ecliptic gear, and a lunar drive gear engaged with said second ecliptic gear;

said equatorial gear of each said solar and lunar drive mechanism is engaged with a said solar drive gear thereof through said first set of coupling gears, and engaged with said lunar drive gear thereof through said second set of coupling gears;

clockwise rotation of said celestial globe about stationary said terrestial globe causes said first ecliptic gear and said second ecliptic gear to rotate in a counter clockwise direction, said first ecliptic gear completing one revolution for approximately every 366.261 revolutions of said celestial globe and said second ecliptic gear completing one revolution for approximately every 27.398 revolutions of said celestial globe;

a solar marker with a securing arm is disposed over the outer periphery of said first ecliptic gear, said securing arm of said solar marker being slidingly secured within a circumferential first retaining groove formed around the outer peripheral portion of said first ecliptic gear, likewise a lunar marker with a securing arm is disposed over the outer periphery of said second ecliptic gear, said securing arm of said lunar marker being slidingly secured within a circumferential second retaining groove formed around the outer peripheral portion of said second ecliptic gear;

said solar marker and said lunar marker rotate about and in proximity to the circle of the ecliptic of said celestial globe, being carried by the rotation of respective said first ecliptic gear and said second ecliptic gear, said solar marker and said lunar marker can be positioned about the circle of the ecliptic of said celestial globe by manually sliding said solar marker and said lunar marker along respective said first groove and said second groove;

whereby, said celestial globe completes one revolution about said terrestial globe in a clockwise direction relative to the north celestial pole thereof in approximately the period of a sidereal day, said solar marker completes one revolution in a counter clockwise direction about said celestial globe in approximately the period of a sidereal year, and said lunar marker completes one revolution about said celestial globe in a counter clockwise direction approximately in the period of a sidereal month;

with said polar axle yoke rotated to align said polar axle with the latitude mark on said latitude scale corresponding to the latitude of a user's location, said celestial globe manually rotated to a proper initial orientation, and said solar and lunar markers moved to proper respective initial positions, the astronomical globe of the present invention will show the positions of the sun, moon, and celestial objects, represented on said celestial globe, relative to a user's location at the time of observation.

2. An automatic tracking astronomical globe according to claim 1, wherein:

markings formed around the periphery of said azimuth circle define an azimuth scale with units of degrees;

a horizon sphere made from a transparent material is disposed around and envelopes said annular frame and said azimuth circle;

said horizon sphere is formed in two halves, in an upper horizon hemisphere and a lower horizon hemisphere with respective diametrical rims, a pair of protrusions are formed on the rim of said upper hemisphere at diametrically opposed positions extending downward therefrom and a pair of recesses are formed on the rim of said lower hemisphere at diametrically opposed positions, a circular opening is formed on the lower portion of said lower hemisphere;

a first channel is formed along a diametrical arc of said upper hemisphere, extending perpendicularly from the rim of said upper hemisphere to the uppermost portion thereof, and a second channel is formed along a diametrical arc of said lower hemisphere, extending perpendicularly from the rim of said lower hemisphere to the rim of said circular opening;

said lower hemisphere is disposed over an annular support flange formed around the upper portion of said mount, with the rim portion of said circular opening resting therein, said upper hemisphere is disposed over said lower hemisphere with said protrusions of said upper hemisphere into said recesses of said lower hemisphere, and said first channel aligned with said second channel to define an elevation track;

markings formed to either side of said elevation track define an elevation scale with units of degrees;

at least one indexer is slidingly secured to said elevation track, said indexer comprising a cylindrical body with a pair of clamps formed on either side thereof engaging respective sides of said elevation track, and a viewing hole formed along the axis of said cylindrical body;

whereby, said horizon sphere can be rotated and said indexer slid along said elevation track to align said indexer over a celestial object represented on said celestial globe as determined by sighting through said viewing hole, the elevation mark on said elevation scale aligned with said indexer and the azimuth mark on said azimuth scale aligned with said elevation track correspond respectively to the local elevation and azimuth angles of the celestial object at the time of measurement.

3. An automatic tracking astronomical globe according to claim 2, wherein a sliding door is disposed on said lower horizon hemisphere near the rim thereof and slidingly secured over an aperture formed thereon, facilitating manual rotation of said celestial globe and said terrestial globe, and the manual positioning of said solar and lunar markers along the ecliptic circle of said celestial globe.

4. An automatic tracking astronomical globe according to claim 1, wherein:

the circumferential outer surface of said celestial globe having an annular solar groove along the path adjacent to said first and second ecliptic gear; an annular solar time scale being rotatable disposed in said annular solar groove and guided by two parallel annular ribs which are protruded at the two parallel sides of said annular solar groove;

said annular solar groove having a guiding slot; a guiding stopper being protruded from the under surface of said annular solar time scale and inserted into said guiding slot;

said annular solar time scale further comprising an adjusting bar, said adjacting bar being extended from said annular solar time scale at a position respective to said guiding stopper;

a calendar pointer being formed on one of said ribs, a screw being screwed to said other rib for pressing said adjusting bar of the annular solar time scale in position;

said annular solar time scale being divided into 365 and $\frac{1}{4}$ days and marks the date February 28 near saidguiding stopper, thus, we can move said adjusting bar to left or right so as to move said guiding stopper within said guiding slot for two days' amendment.

5. An automatic tracking astronomical globe according to claim 1, wherein a compass is secured to said base of said mount.

6. An automatic tracking astronomical globe according to claim 1, wherein said clutch means engaging said celestial globe with said polar axle comprises a precision overrunning type clutch, engaging said celestial globe with said polar axle in a clockwise direction of rotation and freewheeling in a counter clockwise direction, enabling manual rotation of said celestial globe.

7. An automatic tracking astronomical globe according to claim 1, wherein said polar axle gear, said ring gear, and said drive gear of said globe rotation drive mechanism are bevel type gears with said drive gear and said polar axle gear being perpendicular with said ring gear.

8. An automatic tracking astronomical globe according to claim 1, wherein:

said decoupling and raising mechanism comprises a disc wheel disposed within said mount, a shaft secured to said wheel and rotatably secured within said mount with one end thereof extending to the exterior of said mount to secure with an external decoupling knob, first and second pins formed respectively on opposite sides of said wheel at predetermined positions, with each said pin extending perpendicularly therefrom, a first and second collar with a respective pin extending from the outer sides thereof, and a first and second crank;

said first collar is secured in an axial direction to a portion of said sliding coupler and said second collar is secured in an axial direction to a portion of pivoted said shaft of said worm;

one end of said first crank is pivotably secured to said first pin on said wheel and the other end of said first crank is pivotably secured to said pin of said first collar;

one end of said second crank is pivotably secured to said second pin of said wheel and the other end of said second crank is pivotably secured to said pin of said second collar;

whereby, when said decoupling knob is rotated in a clockwise direction, said first crank pivots and raises causing said sliding coupler to move upwards and engage said sliding jaw thereon with said stationary jaw on said shaft of said drive gear, and said second crank pivots and lowers causing pivoted said shaft of said worm to pivot downwards and disengage said worm from said worm gear;

conversely, when said decoupling knob is rotated in a counter clockwise direction, said sliding coupler is lowered and said sliding jaw thereon disengages said stationary jaw on said shaft of said drive gear, and pivoted said shaft of said worm is pivoted upwards engaging said worm with said worm gear.

9. An automatic tracking astronomical globe according to claim 1, wherein:

said epicyclic gear of each said solar and lunar drive mechanism and said equatorial gear are bevel type gears with said epicyclic gear inclined at an angle of approximately 22.5 degrees with respect to said equatorial gear;

said first set of coupling gears engaging said epicyclic gear with said solar drive gear comprises a first worm secured to a common shaft with said epicyclic gear, a first worm gear secured to a common shaft with a second worms, and a second worm gear secured to a common shaft with said solar drive gear;

said second set of coupling gears engaging said epicyclic gear with said lunar drive gear comprises a third worm secured to a common shaft with said epicyclic gear and said first worm, a third worm gear secured to a common shaft with a fourth worm, and a fourth worm gear secured to a common shaft with said lunar drive gear;

said first worm gear is engaged with said first worm, and said second worm is engaged with said second worm gear, in said first set of coupling gears;

said third worm gear is engaged with said third worm, and said fourth worm is engaged with said fourth worm gear, in said second set of coupling gears.

10. An automatic tracking astronomical globe according to claim 1, wherein:

said locking means preventing the rotation of said polar axle yoke comprises a locking screw disposed over the uppermost portion of said annular frame and engaged with a threaded hole thereon, an internal cavity formed within the peripheral wall of said annular frame and in communication with said hole, and a brake shoe disposed within said internal cavity and in contact with an outer peripheral portion of said polar axle yoke;

whereby, when said locking screw is rotated to insert into said internal cavity the end of said locking screw impinges against said brake shoe, forcing said brake shoe against said polar axle yoke and preventing further rotation thereof.

11. An automatic tracking astronomical globe according to claim 1, wherein:

a latitude indicator is secured to said polar axle, between said first bearing and the north celestial pole of said celestial pole;

said latitude indicator includes a pointer disposed over said latitude scale of said annular frame, and a securing eyelet through which said polar axle passes, securing therewith;

said latitude indicator facilitating accurate orientation of said polar axle relative to said annular frame.

12. An automatic tracking astronomical globe according to claim 1, wherein said circumferential gear and said coupler gear of said latitude adjustment mechanism are parallel spur type gears.

* * * * *